United States Patent [19]
Mutoh et al.

[11] Patent Number: 6,068,408
[45] Date of Patent: *May 30, 2000

[54] CAGE FOR A ROLLING BEARING

[75] Inventors: Yasushi Mutoh; Setsu Kawaguchi; Eiichi Takahashi; Kenji Okuma; Magozou Hamamoto; Hideki Koizumi; Tatsunobu Momono; Toshihisa Ohata; Takashi Murai; Banda Noda, all of Kanagawa, Japan

[73] Assignee: NSK Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/728,078

[22] Filed: Oct. 9, 1996

[30] Foreign Application Priority Data

| Oct. 19, 1995 | [JP] | Japan | 7-271047 |
| Dec. 22, 1995 | [JP] | Japan | 7-335018 |
| Jul. 17, 1996 | [JP] | Japan | 8-187769 |
| Sep. 27, 1996 | [JP] | Japan | 8-255856 |

[51] Int. Cl.$^7$ .................................................... F16C 33/38
[52] U.S. Cl. ......................... 384/523; 384/470; 384/533
[58] Field of Search ............................. 384/470, 523, 384/526, 527, 528, 529, 530, 531, 532, 533, 534

[56] References Cited

U.S. PATENT DOCUMENTS

| 1,122,586 | 12/1914 | Gohlke | 384/523 |
| 3,918,777 | 11/1975 | Kitchin | 384/534 X |
| 4,136,915 | 1/1979 | Derner | 384/526 |
| 4,225,199 | 9/1980 | Earsley | 384/470 |

FOREIGN PATENT DOCUMENTS

| 48-59926 | 7/1973 | Japan . |
| 64-38319 | 3/1989 | Japan . |
| 5-61517 | 8/1993 | Japan . |
| 6-82436 | 11/1994 | Japan . |
| 7-4439 | 1/1995 | Japan . |
| 7-279970 | 10/1995 | Japan . |
| 931318 | 3/1962 | United Kingdom . |
| 1 348 629 | 5/1970 | United Kingdom . |
| 2104600 | 3/1983 | United Kingdom ................... 384/531 |
| 2 162 596 | 2/1986 | United Kingdom . |
| 2 166 813 | 5/1986 | United Kingdom . |
| 2 201 471 | 9/1988 | United Kingdom . |

*Primary Examiner*—Thomas R. Hannon
*Attorney, Agent, or Firm*—Sughrue, Mion, Zinn, Macpeak & Seas, PLLC

[57] ABSTRACT

In a rolling bearing including an inner race; an outer race; a plurality of rolling elements rollingly arranged between the inner race and the outer race; and a cage holding the rolling elements, the cage has an annular shape and a plurality of pockets which are formed at plural positions in a circumferential direction of the cage, in which each of the pockets has an opening peripheral portion which is curved to a direction of increasing a distance from a center of the rolling elements. The opening peripheral portion forms a chamfered face or a convex face. The rolling bearing can sufficiently ensure the lubrication of sliding contact portions between the cage and rolling elements so that vibrations and noises of the rolling bearing are lowered.

13 Claims, 18 Drawing Sheets

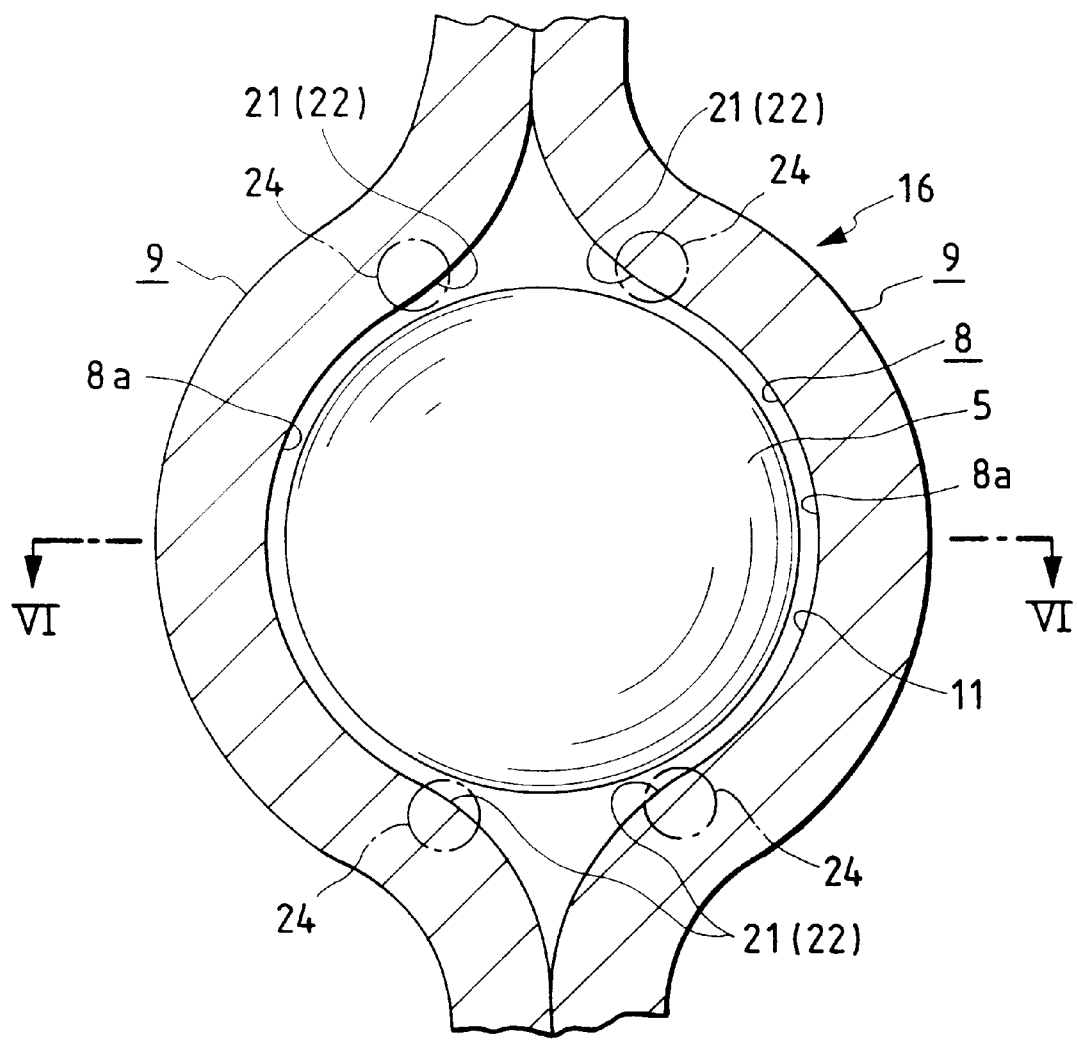

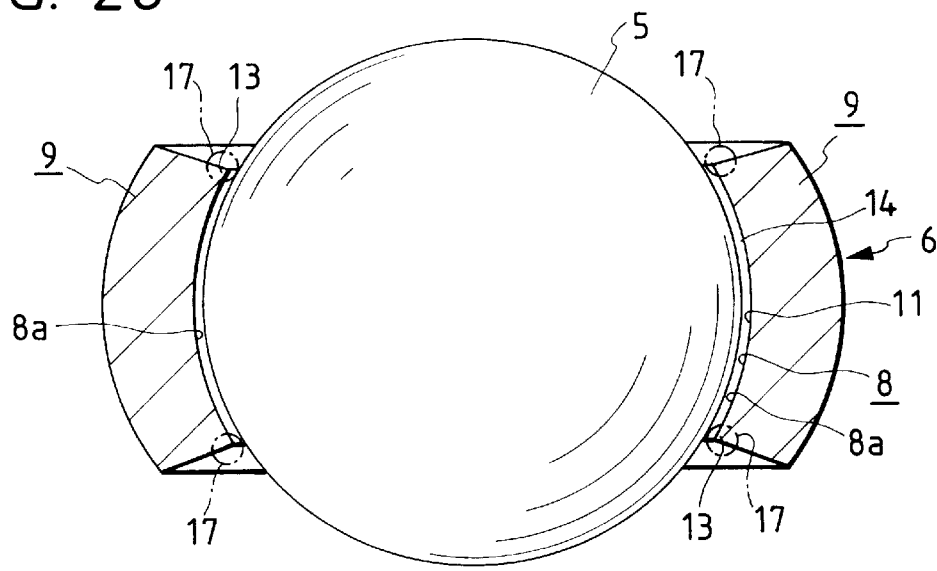
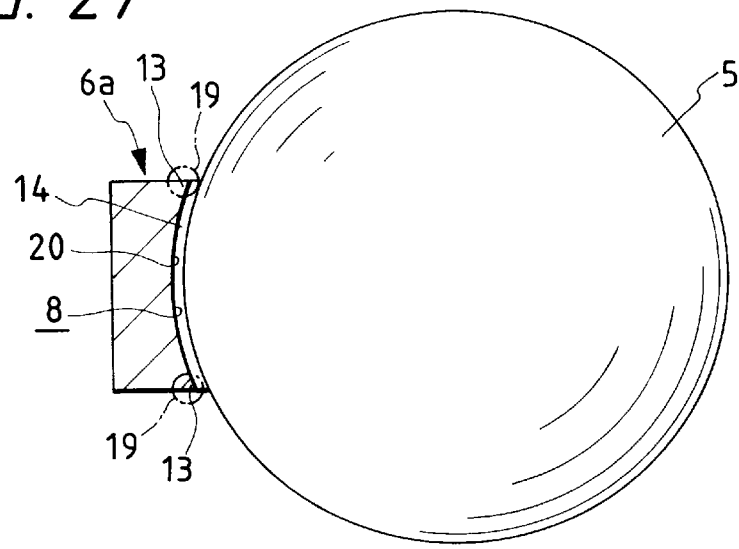

CAGE FOR A ROLLING BEARING

BACKGROUND OF THE INVENTION

The present invention relates to an improvement of a cage constructing a rolling bearing which is used in rotating machines of various types such as a magnetic disk device, an optical disk device, a laser printer, a video tape recorder, a machine tool and a general machine. In the cage for a rolling bearing of the invention, lubrication of sliding contact portions between the cage and rolling elements is sufficiently ensured so that vibrations and noises of the rolling bearing are lowered.

A ball bearing such as shown in FIG. 24 is widely used as a rolling bearing for supporting a variety of rotating portions in rotating machines of various types. In a ball bearing, an inner race 2 having an inner raceway 1 on the outer peripheral face, and an outer race 4 having an outer raceway 3 on the inner peripheral face are concentrically disposed, and a plurality of balls 5 are rollingly arranged between the inner raceway 1 and the outer raceway 3. In the illustrated example, both the inner raceway 1 and the outer raceway 3 are of the deep groove type. The plurality of balls 5 are rollingly held in pockets 8 formed in a cage 6.

The cage 6 which constructs the ball bearing shown in FIG. 24 is the one which is called a corrugated press cage, and combines a pair of elements 9 which are corrugated and formed into an annular shape. Each element is formed by pressing a metal plate member. In the elements 9, substantially semicircular recesses 8a for forming the pockets 8 are formed at plural positions arranged in the circumferential direction. The portions of the pair of elements 9 other than the recesses 8a are butted each other and securely bonded together by a plurality of rivets 10, thereby forming the cage 6 which has an annular shape and forms the pockets 8 at plural positions arranged in the circumferential direction. The middle portion of the inner face of each recess 8a is formed as a holding recessed face 11 having an arcuate section shape and a radius of curvature which is slightly larger than that of the outer face of each ball 5. When the pair of elements 9 are abutted against each other, the recesses 6a are combined with each other and the pockets 8 are formed. A holding recess face 11 is formed as a holding face in the middle portion of each of the pockets 8. The holding recess face 11 has a radius of curvature which is slightly larger than that of the rolling face of each ball 5.

FIG. 25 shows a cage 6a which is called a crown-type cage. In the cage, pockets 8 which rollingly hold the balls 5 (FIG. 24) are formed at plural positions arranged in the circumferential direction of an annular main portion 7 made of a synthetic resin or the like. In the cage 6a of the crown type, each pocket 8 includes: opposing side faces of a pair of elastic pieces 12 which are disposed on the main portion 7 with being separated from each other; and a spherical recessed face 20 which is a part of one face (the upper face in FIG. 24) in the axial direction (the vertical direction in FIG. 24) of the main portion 7 and which is between the pair of elastic pieces 12. The radius of each curvature of the recessed face 20 and the opposing side faces of the elastic pieces 12 is slightly larger than that of the outer face of the ball 5. The opposing side faces of the elastic pieces 12, and the recessed face 20 form a holding recessed face.

When the ball bearing is to be assembled, each ball 5 is pressingly inserted between the pair of elastic pieces 12 forming the pocket 8, while elastically widening the clearance between the front end edges of the elastic pieces 12. In this way, the cage 6a embraces the balls 5 in the pockets 8, so that the balls 5 are rollingly held between the inner raceway 1 and the outer raceway 3 (FIG. 24).

In the use of a ball bearing comprising the cage 6 or 6a, the inner race 2 and the outer race 4 are made relatively rotatable as the plural balls 5 roll. At this time, the balls 5 revolve around the inner race 2 while rotating. The cage 6 or 6a rotates around the inner race 2 at the same speed as the revolution speed of the balls 5.

A lubricant, for example, lubricating oil such as grease is filled or continuously supplied into a space between the outer peripheral face of the inner race 2 and the inner peripheral face of the outer race 4 so that the relative rotation is smoothly performed. This prevents the ball bearing from generating vibrations and noises, and failures such as seizure from occurring. In some types of ball bearings, both end openings of the space between the outer peripheral face of the inner race 2 and the inner peripheral face of the outer race 4 are closed by a sealing member such as a seal plate or a shield plate, thereby preventing the lubricant from leaking from the space or foreign substances such at dust from entering the space. FIG. 24 shows the ball bearing which is not provided with such a sealing member.

In a ball bearing into which the cage 6 or 6a is incorporated, even when a required amount of a lubricant is filled or supplied, there arises a case where vibrations are induced in the cage 6 or 6a and noises called a cage sound or vibrations are generated in the ball bearing into which the cage 6 or 6a is incorporated. Such vibrations of the cage 6 or 6a are caused by large motion of the cage 6 or 6a with respect to the balls 5, and on the basis of sliding friction between the balls 5 which are rolling elements, and the cage 6 or 6a. In order to suppress generation of such a cage sound, conventionally, the clearance between the inner face of each pocket 8 and the rolling surface of the ball 5 is reduced in size so that the amount of motion of the cage 6 or 6a with respect to the balls 5 is reduced, thereby suppressing generation of a cage sound.

When only the amount of motion of the cage 6 or 6a with respect to the balls 5 is reduced, however, a cage sound is generated owing to the shape of the inner peripheral faces of the pockets 8 of the cage 6 or 6a. The reason of this phenomenon will be described with reference to FIGS. 26, 27, and 8B. FIGS. 8A and 8B show differences in structure between the invention and the conventional example. FIG. 8B shows the conventional structure. As shown in FIGS. 26, 27, and 8B, sharp (large curvature) edges 13 exist in opening peripheral portions 17 or 19 of the pockets 8 of the cage 6 or 6a. The edges 13 function as a resistance to the flow of a lubricant. In short, in both the corrugated cage 6 which is produced by pressing a metal plate member and the crown-type cage 6a which is produced by injection molding of a synthetic resin, sharp edges due to burrs exist in opening peripheral portions of the pockets 8, and hence the edges 15 have a very large curvature.

When the clearance between the inner face of each pocket 8 and the rolling surface of the ball 5 is reduced in size in order to suppress a cage sound, a lubricant hardly enters a clearance 14 between the rolling surface of the ball 5 and the holding recessed face 11 (in the case of the cage 6 shown in FIGS. 26 and 8B; in the case of the cage 6a shown in FIG. 27, the recessed face 20 functioning as a holding recessed face). Also edges 15 exist in the peripheral portion of the holding recessed face 11 indicated by a one-dot chain line in FIG. 8B. Accordingly, a lubricant is caused by the rolling of the ball 5 to proceed from the peripheral space to the clearance 14. Consequently, a lubricant which overrides the edges 13 so as to enter the pocket 8 is scraped off by the edges 15, so that the lubricant is caused to hardly enter the clearance 14 in an inner portion of the pocket 8. Therefore, a sufficient amount of the lubricant cannot enter the clearance 14 between the holding recessed face 11 and the rolling surface of the ball 5, with the result that frictional vibration occurring in the sliding contact portions between the cage 6 or 6a and the balls 5 cannot be sufficiently suppressed and vibrations and noises are induced.

Further, when only the amount of motion of the cage 6 or 6a with respect to the ball 5 is reduced, a cage sound may be generated owing to the shape of the inner peripheral face of the pockets 8 of the cage 6 or 6a, under severe operation conditions such as the case where lubrication is insufficiently conducted. Specifically, in the conventional cages 6 and 6a shown in FIGS. 24 and 25, the inner peripheral face of the pocket 8 can be slidingly contacted in its substantially entire width with the rolling surface of the ball 5, and hence the friction force acting between the inner peripheral face and the rolling surface is increased. This phenomenon will be described in detail with reference to FIGS. 28 to 31.

The first example of the conventional structure shown in FIG. 24 will be described. In the inner peripheral face of the pocket 8, as indicated by crosshatching in FIGS. 28 and 29, most of the area of the recess 8a functions over the entire width as a holding and guiding face having a radius of curvature which is slightly larger than that of the rolling surface of the ball 5 (FIG. 24). Also in the case of the second example of the structure indicated by crosshatching in FIGS. 30 and 31, the inner peripheral face of the pocket 8 functions over the entire width as a holding and guiding face having a radius of curvature which is slightly larger than that of the rolling surface of the ball 5.

When the inner peripheral face of the pocket 8 functions over the entire width as a holding and guiding face as described above, the frictional area between the inner peripheral face of the pocket 8 and the rolling surface of the ball is widened. This increases frictional vibration occurring in the sliding contact portions between the cage 6 or 6a and the balls 5, thereby inducing vibrations and noises.

SUMMARY OF THE INVENTION

It is an object of the present invention to provide a cage for a rolling bearing in order to the object is to sufficiently ensure lubrication of sliding contact portions between the cage and rolling elements so that vibrations and noises of the rolling bearing are lowered. In a first aspect of the invention, the object is achieved by the rolling bearing which includes an inner race, an outer race, a plurality of rolling elements rollingly arranged between the inner race and the outer race, and a cage holding the rolling elements and having an annular shape and a plurality of pockets which are formed at plural positions in a circumferential direction of the cage, in which each of the pockets has an opening peripheral portion which is curved to a direction of increasing a distance from a center of the rolling elements.

In the cage for a rolling bearing, at least a part of an inner face of each of the pockets is a convex face having an arcuate section shape. The state where at least a part of an inner face of each of the pockets is a convex face having an arcuate section shape means that, assuming that a plane extending in a diameter direction of the cage for a rolling bearing is a cutting plane, at least a part of the section shape of the pocket is curved so as to be convex toward the rolling surface of a rolling element held by the pocket.

In the cage for a rolling bearing, particularly, a portion which is at least a part of the pocket and in which a frequency of contacting with a rolling surface of corresponding one of the rolling elements is high satisfies at least one of following conditions (1) and (2):

(1) an opening peripheral portion of the pocket is a convex face having an arcuate section shape and a radius of curvature which is not smaller than 1% of an outer diameter of the rolling element; and (2) a holding face peripheral portion exists between the opening peripheral portion of the pocket and the holding face, the holding face peripheral portion having an arcuate section shape and a radius of curvature which is not smaller than 10% of the outer diameter of the rolling element.

The radii of curvature in the conditions (1) and (2) above mean those of section shapes obtained by using a plans extending in a diameter direction of the cage for a rolling bearing as a cutting plane.

In the cage for a rolling bearing of the invention, particularly, at least a part of an opening peripheral portion of each of the pockets is chamfered.

Preferably, the rolling elements are balls, the chamfers are curved faces having an arcuate section shape, and the radius of curvature of the section shape of the chamfers is 1% to 20% of the outer diameter of the balls.

More preferably, the radius of curvature of the section shape of the chamfers is 2% to 16% of the outer diameter of the balls, and, further preferably, the radius of curvature of the section shape of the chamfers is 5% to 15% of the outer diameter of the balls.

In the cage for a rolling bearing according to a second aspect of the invention, the inner face of each of the pockets is a holding and guiding face having a radius of curvature which is slightly larger than that of the rolling surface of a rolling element which is to be rollingly held in the pocket. In particular, the holding and guiding faces have different widths, and the distance between a non-holding and non-guiding face and the rolling surface is larger than the distance between the holding and guiding face and the rolling surface, the non-holding and non-guiding face existing in a portion which is in the inner face of the pocket and outside the holding and guiding face in the width direction.

The function exerted when the thus configured cage for a rolling bearing of the invention rollingly holds a plurality of rolling elements is identical with that exerted in the case of the conventional cages for a rolling bearing. In the cage for a rolling bearing according to the first aspect of the invention, particularly, a lubricant can easily enter the clearances between the inner faces of the pockets and the rolling surfaces of the rolling elements, thereby improving the lubrication state of the sliding contact portions. In the cage for a rolling bearing of the invention, since at least a part of an inner face of each pocket is a convex face having an arcuate section shape, the distance between the opening peripheral portion of the pocket and the rolling surface of the rolling element is sufficiently ensured. As a result, the rolling of the rolling element causes the lubricant in the vicinity of the rolling element to easily enter the clearance between ling surface. Moreover, in the cage for a rolling bearing of the invention, the inner face of the pocket and the rolling surface contact with each other in state similar to point contact rather than surface contact, so that sliding friction between the inner face and the rolling surface is reduced. These phenomena cause noises called a cage sound or vibrations to be hardly generated.

In the cage for a rolling bearing, in the case where the opening peripheral portion of each pocket is a convex face having an arcuate section shape and a predetermined radius of curvature, there exists no sharp edge and hence a lubricant is not hindered from entering the pocket, thereby enabling the lubricant to easily enter the pocket. In the case where the holding face peripheral portion is a convex face having an arcuate section shape and a radius of curvature specified above, no edge exists in the holding face peripheral portion, and hence a lubricant is not scraped off and the lubricant easily enters the pocket. Also these phenomena cause noises called a cage sound or vibrations to be hardly generated.

Further, in the cage for a rolling bearing of the invention, a lubricant can easily enter the clearances between the inner faces of the pockets and the rolling surfaces of the rolling elements, thereby improving the lubrication state of the sliding contact portions. In short, because of the existence of the chamfers formed in an opening peripheral portion of each pocket, the lubricant is not prevented from entering the interior of the pocket, and hence the lubricant can easily enter the interior of the pocket. As a result, vibrations and noises called a cage sound are hardly generated.

In the cage for a rolling bearing according to the second aspect of the invention, the inner peripheral face of each pocket and the rolling surface of a rolling element rub against each other only in the holding and guiding face and do not rub against each other in the non-holding and non-guiding face. Therefore, the frictional area between the inner peripheral face of the pocket and the rolling surface of the rolling element is reduced, with the result that frictional vibration occurring in the sliding contact portions between the cage and the rolling elements is reduced and vibrations and noises are lowered.

BRIEF DESCRIPTION OF THE DRAWINGS

FIG. 7 is a section view taken along the line VII—VII of FIG. 6;

FIG. 8A shown the sixth embodiment; FIG. 8B shows a conventional example;

FIG. 26 is an enlarged section view showing a state where a ball is held in a cage shown in FIG. 24;

FIG. 27 is an enlarged section view showing a state where a ball is held in the cage shown in FIG. 25;

DETAILED DESCRIPTION OF THE PREFERRED EMBODIMENTS

Figure 1:
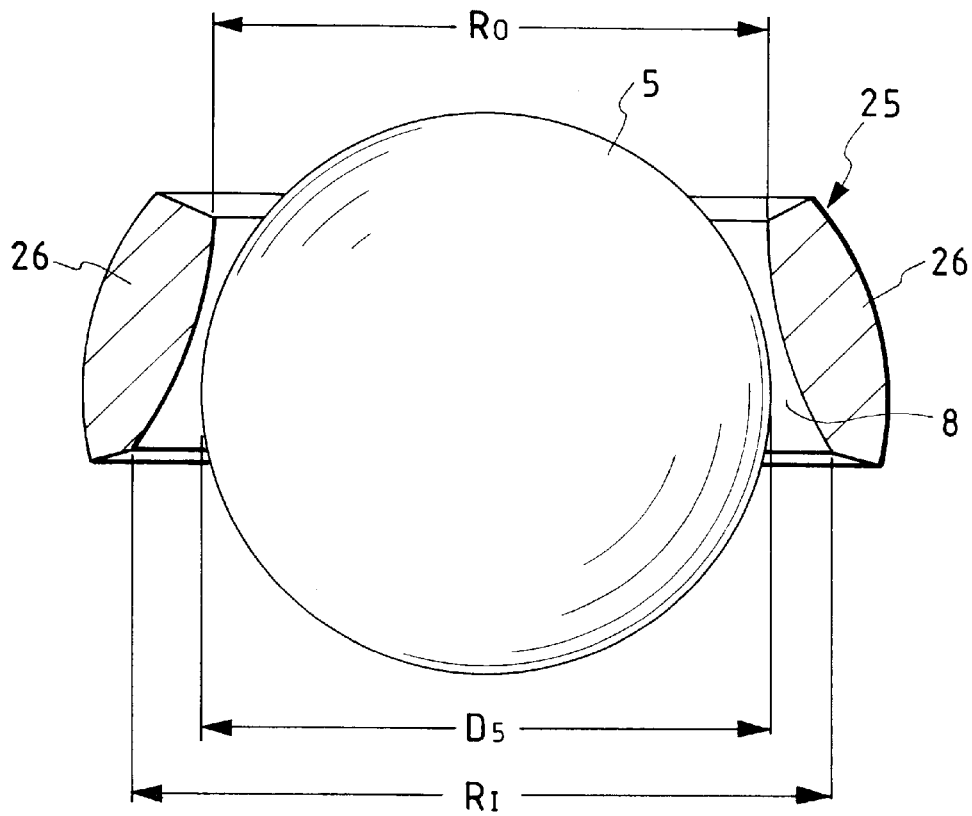
FIG. 1 is an enlarged section view showing a part of a cage which holds a ball and which is a first embodiment of the invention.

FIG. 1 shows a first embodiment of the present invention in which the invention is applied to a corrugated press cage constructing a ball bearing. In order to rollingly hold a plurality of balls 5 functioning as rolling elements, the cage 25 combines a pair of elements 26 which are corrugated, and is formed into an annular shape as a whole. In the elements, pockets 8 are formed at plural positions arranged in the circumferential direction.

In each of the elements 26, at least the portion forming each pocket 8 has a barrel-shaped or oval section. Therefore, the inner face of the pocket 8 is a curved face which is curved so as to be convex toward the rolling surface of the ball 5 held by the pocket 8 (with respect to the section shape on the assumption that a plane extending in a diameter direction of the cage for a rolling bearing is a cutting plane). In the first embodiment, furthermore, the inner diameter of each pocket 8 is made smaller on the side of the outer periphery of the cage 25 (the upper side in FIG. 1), and larger on the side of the inner periphery (the lower side in FIG. 1). The inner diameter $R_O$ of the opening of the pocket 8 on the outer periphery side is smaller than the outer diameter $D_5$ of the ball 5; and the inner diameter $R_I$ on the inner periphery side is larger than the outer diameter $D_5$ ($R_O < D_5 < R_I$). When the ball 5 is to be held by the pocket 8, the ball 5 is inserted from the opening of the pocket 8 on the inner periphery side. When the cage 25 having such pockets 8 cooperates with the inner and outer races 2 and 4 (FIG. 24) to construct a ball bearing, the position is restricted in a diameter direction by engagement with the balls 5. Namely, the cage 25 rotates under so-called ball guidance.

In the thus configured cage 25 of the first embodiment, since the inner face of each pocket 8 is a convex face having an arcuate section shape, the distance between the opening peripheral portion of the pocket at each end and the rolling surface of the ball 5 is sufficiently ensured. As a result, during operation of the ball bearing, a lubricant such as grease existing in the vicinity of the pocket 8 easily enters between the inner face of the pocket 8 and the rolling surface of the ball 5 as the ball 5 rolls, thereby reducing sliding friction between the inner face of the pocket 8 and the rolling surface of the ball 5. Furthermore, the sliding friction between the two faces is reduced also by reduction of the contact area between the two faces. Specifically, in the conventional structures shown in FIGS. 24 and 25, the two faces contact with each other in a contact state which is similar to surface contact, and hence relatively large sliding friction acts between the two faces. By contrast, in the first embodiment, the two faces contact with each other in a contact state which is similar to line contact or point contact, and hence sliding friction between the inner face and the rolling surface is reduced. As a result, noises called a cage sound or vibrations are hardly generated.

Figure 2:
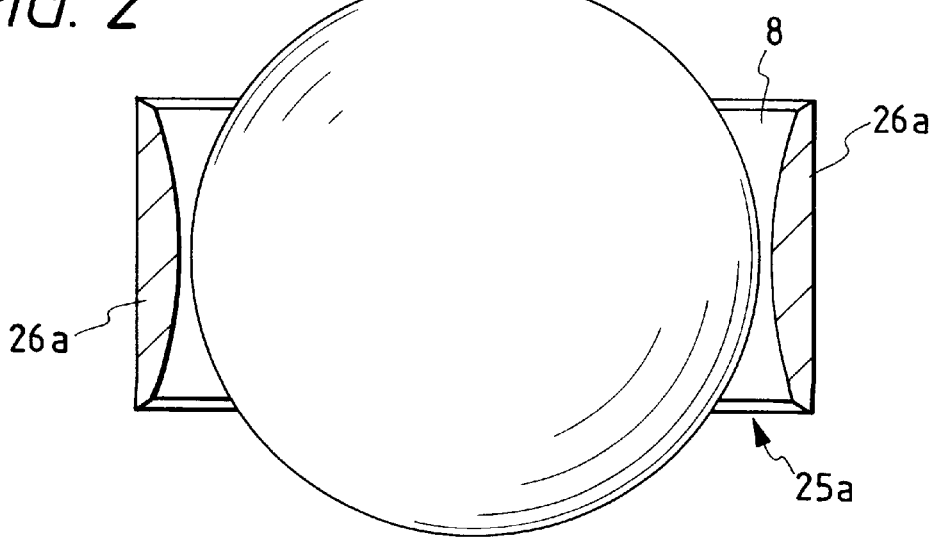
FIG. 2 is a view showing a second embodiment and similar to FIG. 1.

FIG. 2 shows a second embodiment of the present invention. In the second embodiment, the inner diameter of the opening of each pocket 8 on the side of the outer periphery (the upper side in FIG. 2) is substantially equal to that of the opening on the side of the inner periphery (the lower side in FIG. 2). Further, in a pair of elements 26a forming the cage 25a, at least the inner face of each pocket 8 is a curved face which is curved so as to be convex toward the rolling surface of the ball 5 held by the pocket 8. Consequently, the second embodiment is configured so that the inner diameter of each pocket 8 is smallest in the middle portion. When the cage 25 is assembled with the inner and outer races 2 and 4 (FIG. 24) to construct a ball bearing, the position in a diameter direction is restricted by engagement between the outer peripheral face of the cage 25a and the inner peripheral face of the outer race 4, or by engagement between the inner peripheral face of the cage 25a and the outer peripheral face of the inner race 2. Namely, the cage 25 rotates under so-called raceway guidance. Also in the second embodiment thus configured, because of functions which are the substantially same as those of the first embodiment, noises called a cage sound or vibrations are hardly generated.

Figure 3:
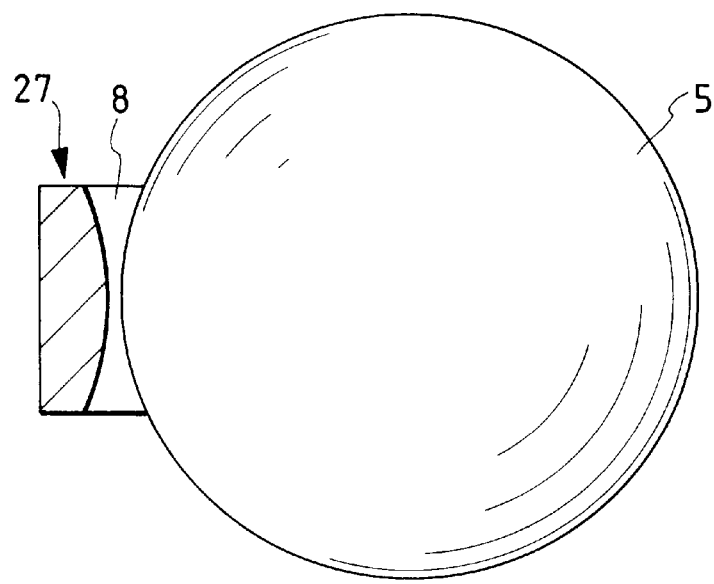
FIG. 3 is a view showing a third embodiment and similar to FIG. 1.
Figure 4:
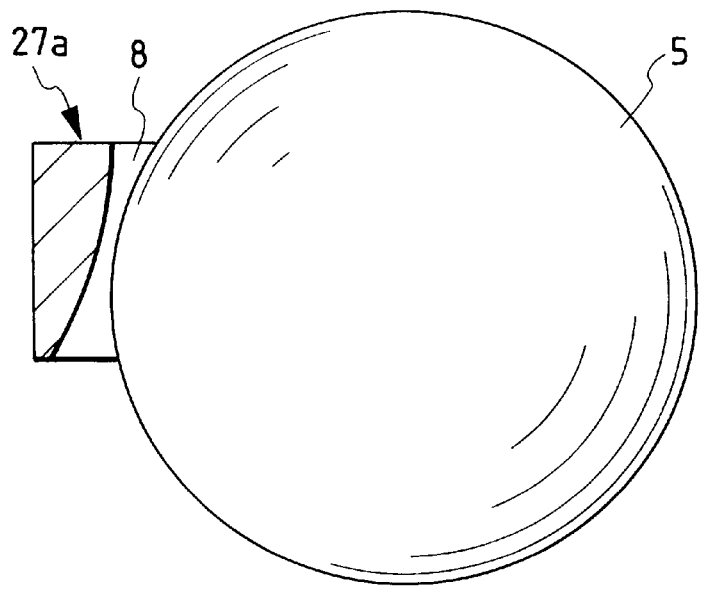
FIG. 4 is a view showing a fourth embodiment and similar to FIG. 1.
Figure 5:
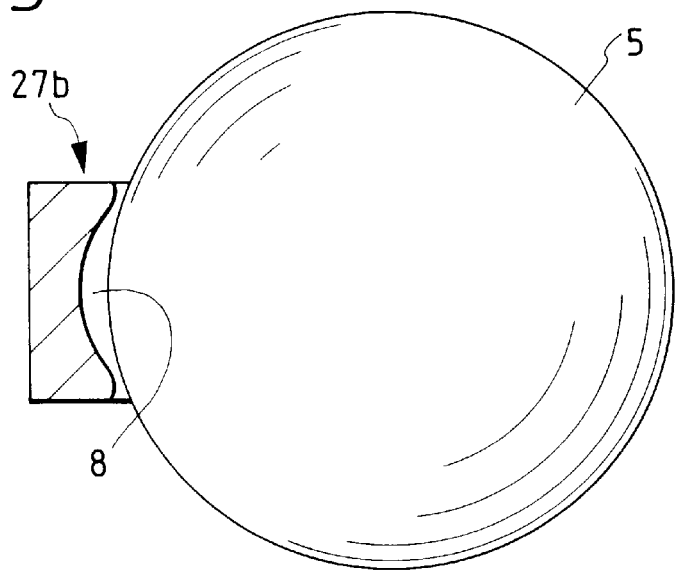
FIG. 5 is a view showing a fifth embodiment and similar to FIG. 1.
Figure 25:
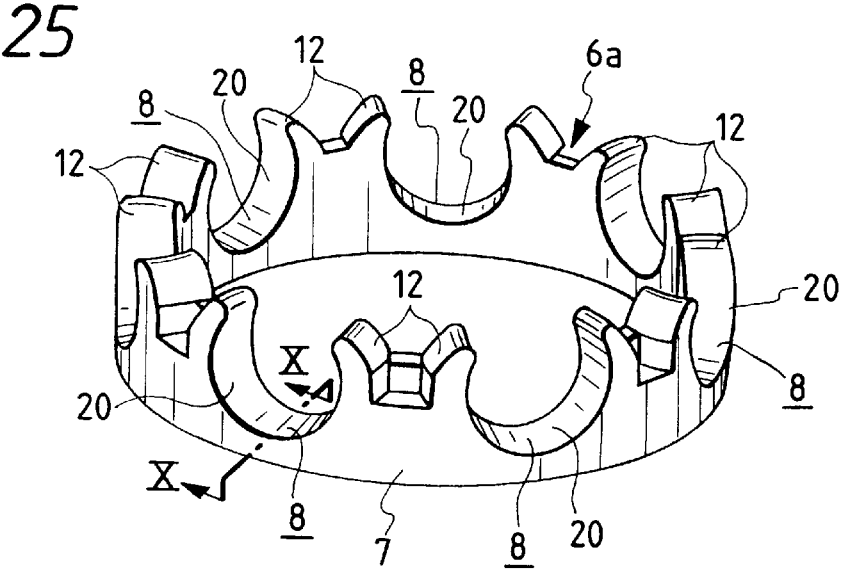
FIG. 25 is a perspective view showing another example of a conventional cage.
Figure 28:
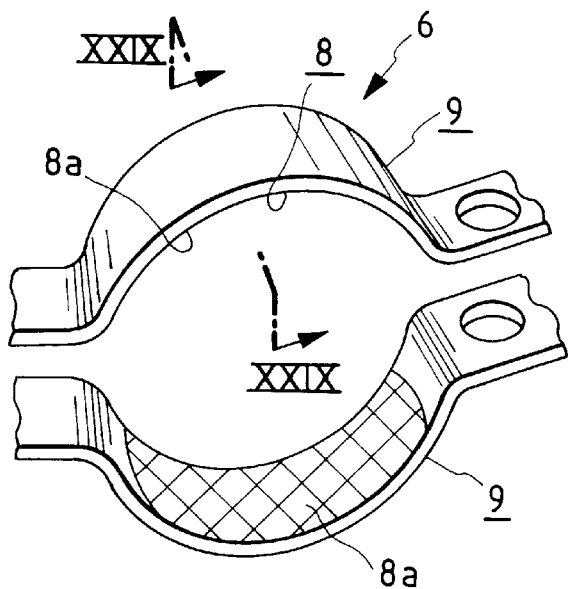
FIG. 28 is a partial enlarged exploded perspective view showing a first example of a conventional cage.
Figure 29:
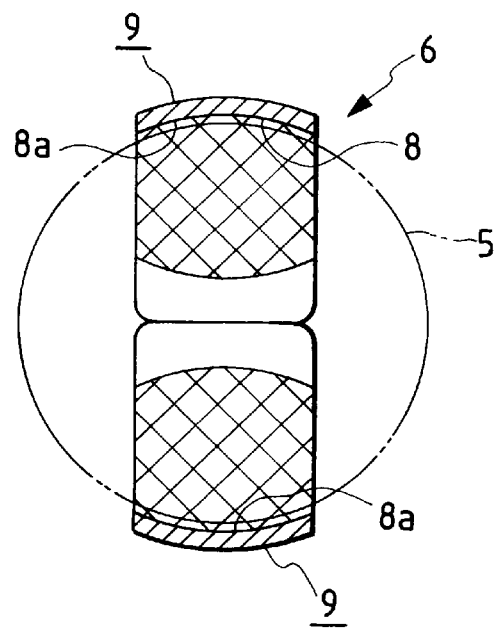
FIG. 29 is a section view taken along the line XXIX—XXIX of FIG. 28 and showing an assembled state.

FIGS. 3 to 5 show third to fifth embodiments of the invention. In the embodiments, unlike the first and second embodiments described above, the invention is applied to a crown-type cage constructing a ball bearing. Further, the section shape of the pocket shown in FIG. 27 of a crown-type cage which has a whole shape such as that shown in FIG. 25 is replaced with those shown in FIGS. 3 to 5, thereby lowering a cage sound.

In the third embodiment shown in FIG. 3, the inner face of each pocket 8 is a curved face which is curved so as to be convex toward the rolling surface of the ball 5 held by the pocket 8. In the third embodiment, the inner diameter of each pocket 8 is smallest in the middle portion. When the cage 27 of the third embodiment cooperates with the inner and outer races 2 and 4 (FIG. 24) to construct a ball bearing, therefore, the cage 27 rotates under so-called raceway guidance.

In the fourth embodiment shown in FIG. 4, the inner diameter of the opening of each pocket 8 on the outer periphery side (the upper side in FIG. 4) is smaller than the outer diameter of the ball 5, and that of the opening on the inner periphery side (the lower side in FIG. 4) is larger than the outer diameter. When the cage 27a of the fourth embodiment cooperates with the inner and outer races 2 and 4 (FIG. 24) to construct a ball bearing, therefore, the cage 27 rotates under so-called ball guidance.

In the fifth embodiment shown in FIG. 5, only the openings at the ends of the inner and outer periphery sides (the upper and lower ends in FIG. 5) of each pocket 8 are formed as a curved face which is curved so as to be convex toward the rolling surface of the ball 5. In each pocket 8, the middle portion of the inner face is a recessed face having a radius of curvature which is smaller than that of the rolling surface of the ball 5. In the fifth embodiment, the cage 27b rotates under ball guidance.

Also in the third to fifth embodiments, because of functions which are the substantially same as those of the first and second embodiments, noises called a cage sound or vibrations are hardly generated. In the fifth embodiment shown in FIG. 5, particularly, the lubricant such as grease is held (stays) between the middle portion of the inner face of the pocket 8 and the rolling surface of the ball 5, and hence lubrication between the inner face and the rolling surface is satisfactorily conducted, with the result that a cage sound can be prevented more surely from being generated.

Figure 6:
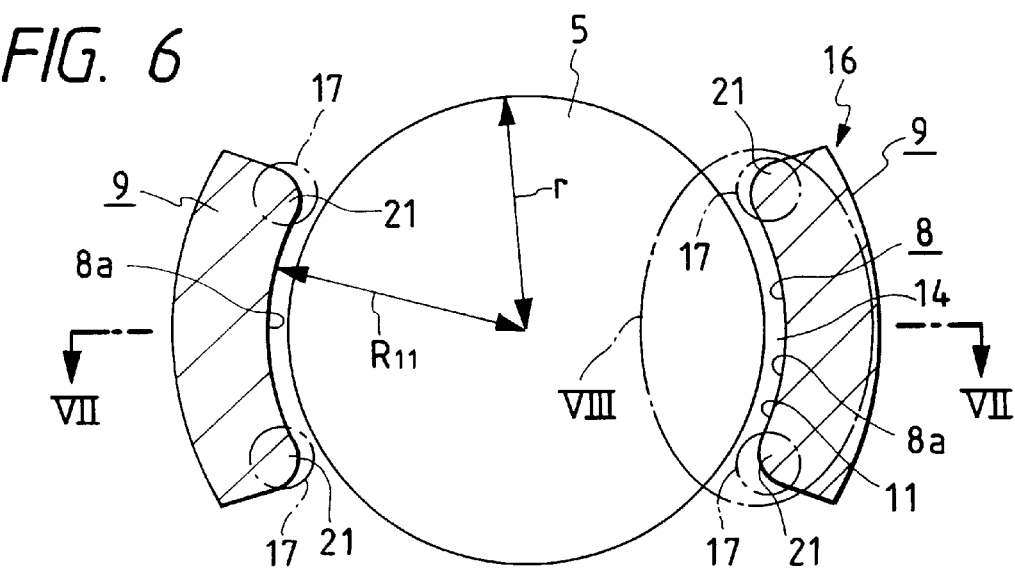
FIG. 6 is a section view taken along the line VI—VI of FIG. 7 and showing a sixth embodiment.
Figure 8A:
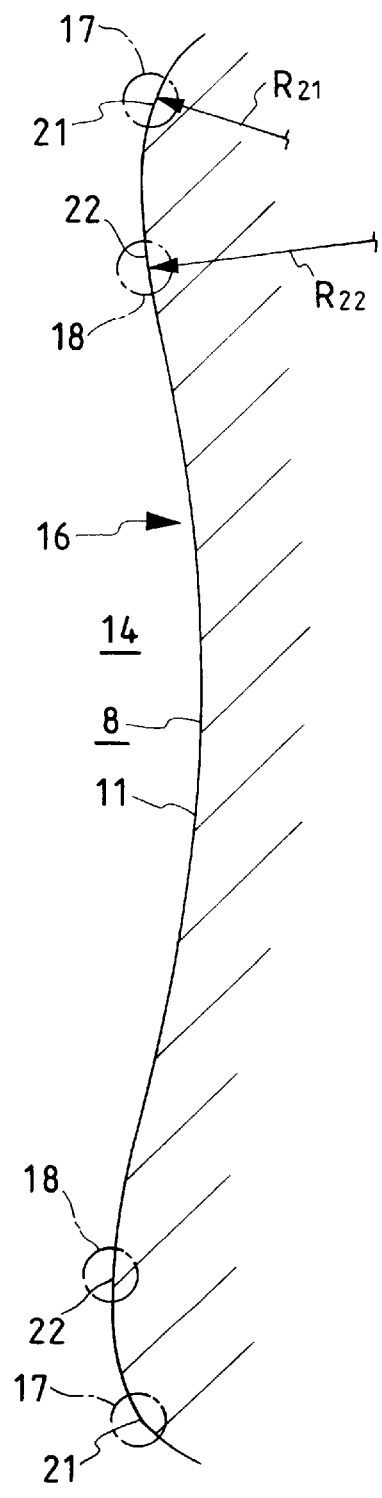
FIGS. 8A and 8B are enlarged section views showing portions corresponding to a portion VIII in FIG. 6.

FIGS. 6 to 8 show a sixth embodiment of the invention in which the invention is applied to a corrugated press cage constructing a ball bearing. In order to rollingly hold a plurality of balls 5 functioning as rolling elements, the cage 16 is formed into an annular shape as a whole, and pockets 8 are formed at plural positions arranged in a circumferential direction. In the middle portion of the inner face of each of the pockets 8, formed is a holding recessed face 11 having an arcuate section shape and functioning as a holding face. The holding recessed face 11 has a radius of curvature $R_{11}$ which is slightly larger than the radius of curvature r of the rolling surface of the ball 5. A pair of elements 9 in which recesses 8a forming the pockets 8 are engaged with each other, and the portions of the elements 9 other than the recesses 8a are securely bonded together by plural rivets 10, thereby forming the cage 16. The pair of elements 9 is obtained by, for example, pressing a metal plate member such as a steel plate into a corrugated shape. The shape of the inner peripheral face of each of the recesses 8a is a spherical recessed face having the radius of curvature $R_{11}$. According to this configuration, the middle portion of the inner face of the pocket 8 configured by the recesses 8a is formed as the holding recessed face 11 having the radius of curvature $R_{11}$.

In the cage for a rolling bearing of the invention, particularly, the opening peripheral portions 17 of the pocket 8, and peripheral portions 18 of the holding recessed face 11 are formed as convex faces 21 and 22 having an arcuate section shape, respectively. The peripheral portions 18 exist in a part of the portion encircled by a one-dot chain line in FIG. 6 indicating the opening peripheral portions 17. In FIG. 6, however, the peripheral portions 18 are not illustrated. In the case where the opening peripheral portions 17 are formed as the convex faces 21, the radius of curvature $R_{21}$ of the convex faces 21 is not smaller than 1% of the outer diameter 2r of the rolling surface of the ball 5 ($R_{21} \geq 0.02r$). In the case where the peripheral portions 18 of the holding recessed face 11 are formed as the convex faces 22, the radius of curvature $R_{22}$ of the convex faces 22 is not smaller than 10% of the outer diameter 2r of the rolling surface of the ball 5 ($R_{22} \geq 0.2r$). The convex faces 21 and 22 can be easily formed by a working method known in the art such as barreling work, or shot blast.

The function exerted when the thus configured cage 16 rollingly holds the plural balls 5 is identical with that exerted in the case of the conventional cage 6 (FIG. 24) described above. In the cage 16 of the sixth embodiment, particularly, the opening peripheral portions 17 and the peripheral portions 18 are formed as the convex faces 21 and 22 having an arcuate section shape and the radii of curvature $R_{21}$ and $R_{22}$, respectively. Even when the clearance 14 between the rolling surface of the ball 5 and the holding recessed face 11 is made small in order to reduce the displacement amount of the cage 16 with respect to the ball 5, therefore, the lubricant can easily flow into the clearance 14 and further also into the interior of the pocket 8.

Figure 8B:
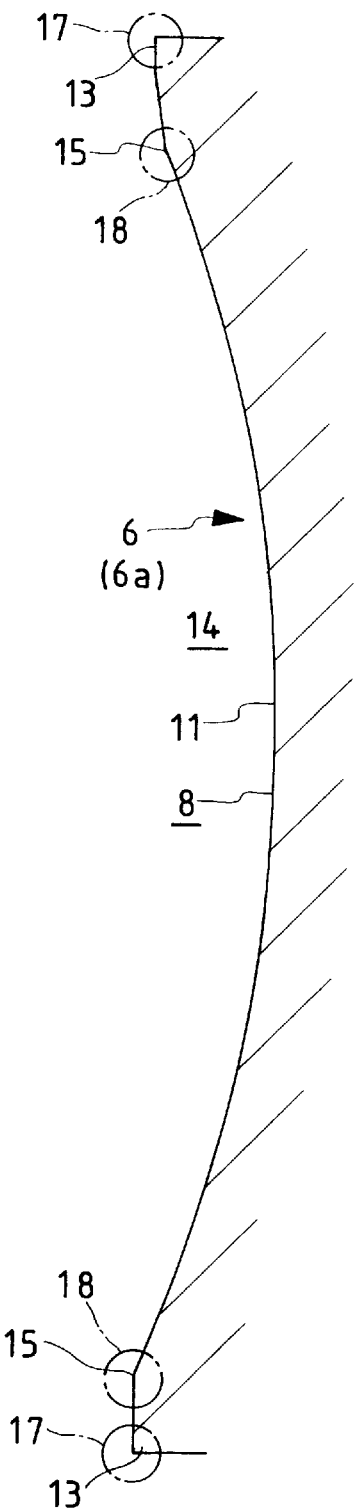

The configuration in which the opening peripheral portions 17 are formed as the convex faces 21 makes no sharp edges 13 such as shown in FIG. 8B to be eliminated. Therefore, the lubricant can easily flow into the interior of the pocket 8. The configuration in which the peripheral portions 18 are formed as the convex faces 22 makes no edges 15 such as shown in FIG. 8B to be eliminated. Consequently, the phenomenon that the lubricant is scraped off by the pocket 8 to the exterior, thereby allowing the lubricant to easily enter the inner portion of the pocket 8. As a result, the lubrication state of the sliding contact portions between the rolling surface of the ball 5 and the holding recessed face 11 of the cage 16 is improved. Because of the wedge effect owing to the existence of the convex faces 21 and 22, a firm film of the lubricant is formed in the clearance 14. This prevents the thickness of the clearance 14 from being easily changed, with the result that the ball 5 and the cage 16 are hardly displaced.

In this way, the improvement of the lubrication properties of the sliding contact portions between the cage 16 and the balls 5 causes a ball bearing configured by using the cage 16 of the sixth embodiment, to hardly generate vibrations and noises. In order to ascertain the effects of the invention, the inventors have conducted comparison experiments in which frequency spectra of noises generated by a ball bearing using the conventional cage 6, and that using the cage 16 according to the invention were measured. In the ball bearings used in the experiment, the outer diameter of the outer race is 35 mm, the width of the outer race is 11 mm, the inner diameter of the inner race is 15 mm, the diameter of a ball is 6 mm, and the number of balls is eight. The value of $R_{21}$ was set to be 0.1 mm in the cage of the invention, and 0.05 mm in the conventional cage, and that of $R_{22}$ was set to be 0.6 mm in the cage of the invention, and 0.1 mm in the conventional cage.

Figure 9:
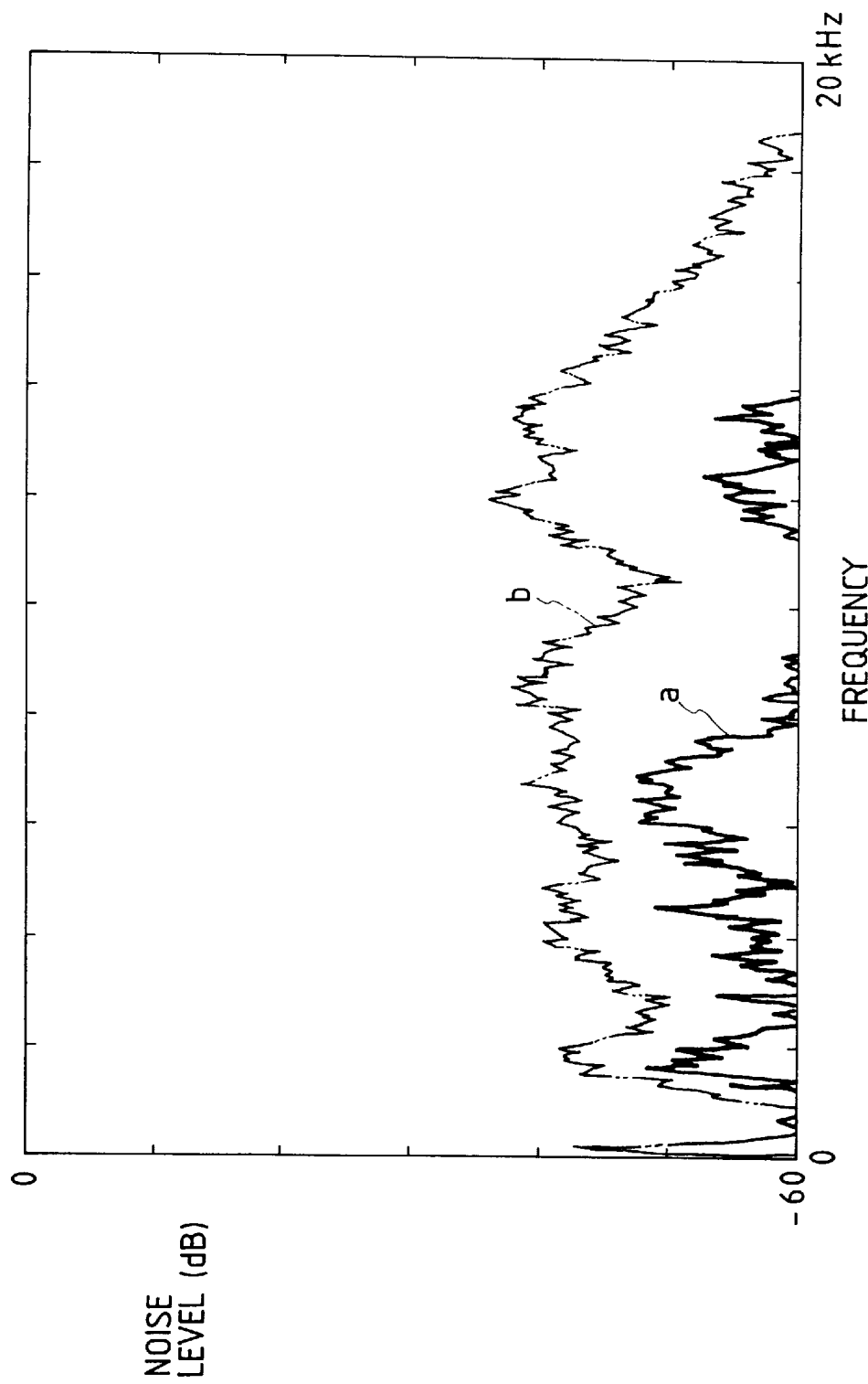
FIG. 9 is a diagram showing results of tests which were conducted in order to ascertain the effects of the invention.

Results of the experiments conducted under these conditions are shown in FIG. 9 in the form of frequency spectra of the ball bearings. In FIG. 9, the abscissa indicates the frequency and the ordinate the noise level. The two lines a and b indicate measurement results. The solid line a shows the frequency spectrum of noises generated by the ball bearing configured by using the cage 16 according to the present invention. The two-dot chain line b shows the frequency spectrum of noises generated by the ball bearing configured by using the conventional cage 6. In the ball bearings, parts which are identical (or equivalent) to each other were used as components of the ball bearings other than the cages. As seen from FIG. 9, in the ball bearing using the cage 16 according to the invention, the frequency spectrum has a low peak. In the ball bearing using the cage 16 according to the invention, moreover, the high-frequency components which are inconsonant to the ear are remarkably reduced, or the sound characteristics are improved. Although results are not shown, the same tests were conducted also on the first to fifth embodiments shown in FIGS. 1 to 5. It was ascertained that, in the cages for a rolling bearing of these embodiments, a cage sound can be lowered.

The reason of the configuration in which the radii of curvature $R_{21}$ and $R_{22}$ of the convex faces 21 and 22 are respectively not smaller than 1% and 10% of the diameter of the rolling surface of the ball 5 will be described. When the radius of curvature $R_{21}$ is smaller than 1% of the outer diameter of the rolling surface of the ball 5, the opening peripheral portions 17 of the pocket 8 have a large curvature and function as a resistance to the flow of the lubricant, thereby hindering the lubricant from flowing into the pocket 8. To comply with this, the radius of curvature $R_{21}$ is set not to be smaller than 1% of the outer diameter of the ball 5. When the radius of curvature $R_{22}$ is smaller than 10% of the outer diameter of the ball 5, the curvature of the convex faces 22 is excessively large, so that also the lubricant which overrides the opening peripheral portions 17 so as to enter the pocket 8 is scraped off by the convex faces 22, so that the lubricant is caused to hardly enter an inner portion of the pocket 8. To comply with this, the radius of curvature $R_{22}$ is set not to be smaller than 10% of the outer diameter of the ball 5.

Since the cage 16 of the sixth embodiment is configured as described above, the lubricant easily flows into the pocket 8, and the lubricant which has once entered the pocket 8 hardly flows out from the pocket. Consequently, the lubricant can easily enter an inner portion of the pocket 8. This improves the lubrication state of the sliding contact portions between the ball 5 and the inner peripheral face of the cage 16. As a result, in a ball bearing configured by using the cage 16, it is possible to suppress the sound generation of the cage, to thereby reduce the vibrations and the noises.

In the sixth embodiment, the opening peripheral portions 17 and the peripheral portions 18 of the holding recessed face 11 are formed as the convex faces 21 and 22, respectively. Even in the case where only either of the portions 17 and 18 is formed as a convex face, the lubrication properties are improved as compared with the conventional cage. In both the cases where the portions 17 and 18 are formed as the convex faces 21 and 22, respectively, and where only the peripheral portions 18 are formed as the convex faces 22, the edges 15 are not formed, and hence the phenomenon that the edges 15 are prevented from contacting with the rolling surface of the ball 5 does not occur. Consequently, the rolling surface is prevented from contacting with a portion having a large curvature. When the rolling surface contacts with a portion having a large curvature, it is difficult to sufficiently form an oil film in the contact portion, and hence vibrations are easily generated in the contact portion. In the sixth embodiment, also vibrations and noises owing to such a reason can be suppressed. The convex faces 21 and 22 are not required to be formed over the whole of the circumference of the pocket 8, and may be formed only in a portion through which the lubricant can easily enter. For example, the convex faces 21 and 22 of the radii of curvature $R_{21}$ and $R_{22}$ may be formed only in end portions 24 indicated by circles of a chain line in FIG. 7. In this case, the convex faces 21 and 22 can be formed by a mechanical polishing method such as buff polishing. This is applicable also to the first to fifth embodiments.

Figure 10:
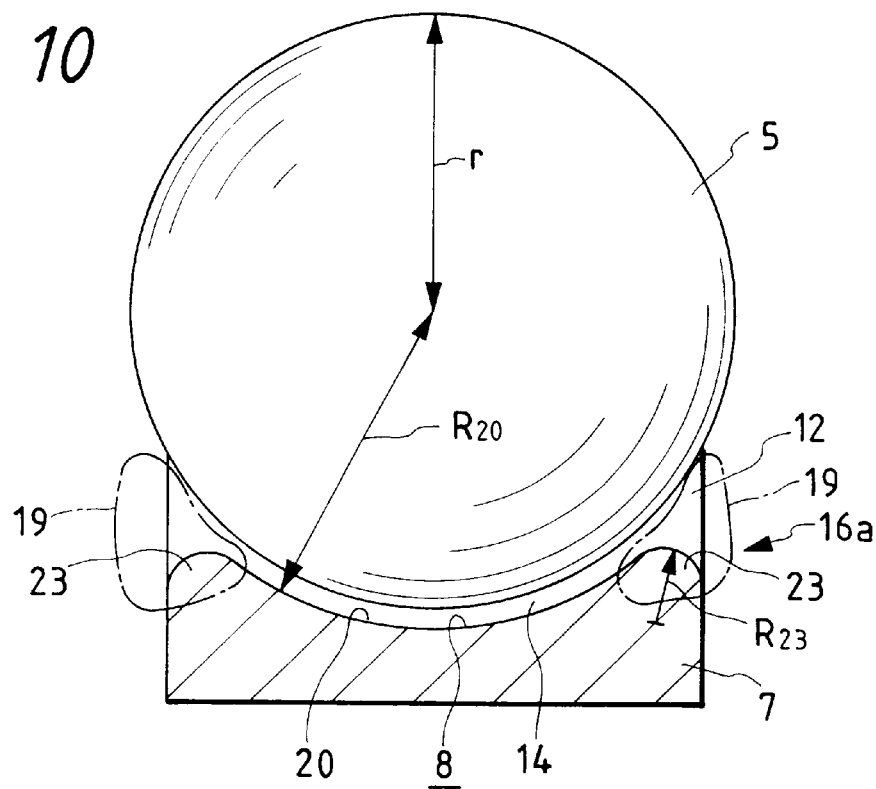
FIG. 10 is a view showing a seventh embodiment corresponding to section X—X in FIG. 25.

FIG. 10 shows a seventh embodiment of the invention. In the seventh embodiment, the invention is applied to the crown-type cage shown in FIG. 25. In the same manner as the conventional cage 6a (FIG. 25), the cage 16a comprises an annular main portion 7 made of a synthetic resin, and a plurality of pockets 8 which are formed at plural positions arranged in the circumferential direction of the main portion 7 and in which balls 5 functioning as rolling elements are rollingly held, respectively. Each pocket 8 includes: a pair of elastic pieces 12 which are disposed on the main portion 7 with being separated from each other; and a recessed face 20 which is a part of one face (the upper face in FIG. 10) in the axial direction of the main portion 7 and which is between the pair of elastic pieces 12. The recessed face 20 and the opposing side faces of the elastic pieces 12 are formed as a spherical recessed face having a radius of curvature $R_{20}$ which is slightly larger than the radius of curvature r of the rolling surface of the ball 5 to be held by the cage 16a. The recessed face 20 and the opposing side faces of the pair of elastic pieces 12 form a holding face (corresponding to the holding recessed face 11 in the sixth embodiment).

Opening peripheral portions 19 encircled by a one-dot chain line in FIG. 10 are formed as convex faces 23 having an arcuate section shape. The radius of curvature $R_{23}$ of the convex faces 23 is not smaller than 1% of the outer diameter (≈2r) of the ball 5 ($R_{23} \geq 0.02r$). The reason of this configuration is the same as that of the sixth embodiment. In the seventh embodiment, only the opening peripheral portions 19 are configured as the convex faces 23 having an arcuate section shape. The configuration of the other components, and the function of the seventh embodiment are the same as those of the sixth embodiment.

Furthermore, the convex faces 23 may be formed as chamfers having an arcuate section shape which are subjected to barreling work or the like and formed in the whole length of the opening peripheral portions 19.

The first to tenth embodiments have been described in which the invention is applied to a crown-type cage constructing a ball bearing. The invention is not restricted to such a crown-type cage for a ball bearing, and can be applied to any cage for a rolling bearing such as corrugated cage, or a cage for a roller bearing. Furthermore, the invention can attain effects not only in the structure having the clearance which is made small between the rolling surface and the inner face of a pocket in order to reduce the displacement amount of the cage with respect to a rolling element, but also the structure having the clearance which is made in the conventional size.

According to the first to tenth embodiments, each of the pockets has the opening peripheral portion which is curved to a direction of increasing a distance from a center of the rolling element so that a distance between the opening peripheral portion and the rolling surface of the rolling elements is increased with respect to a width direction of the cage.

Particularly, in the cage for a rolling bearing of the invention, a lubricant which is caused by the rolling of the ball 5 to proceed from the peripheral space to a clearance 14 between the rolling surface of the ball 5, and the opposing side faces of the pair of elastic pieces 12 and the recessed face 20 efficiently enters the clearance 14 without being largely scraped off by the opening peripheral portions 19. Consequently, a sufficient amount of the lubricant can enter the clearance 14 between the opposing side faces of the pair of elastic pieces 12 and the recessed face 20, and the rolling surface of the ball 5, and the lubricant is held in the clearance 14 for a long period. As a result, frictional vibration occurring in the sliding contact portions between the cage 16a and the balls 5 can be sufficiently suppressed and the possibility of generating vibrations and noises is lowered.

Figure 11:
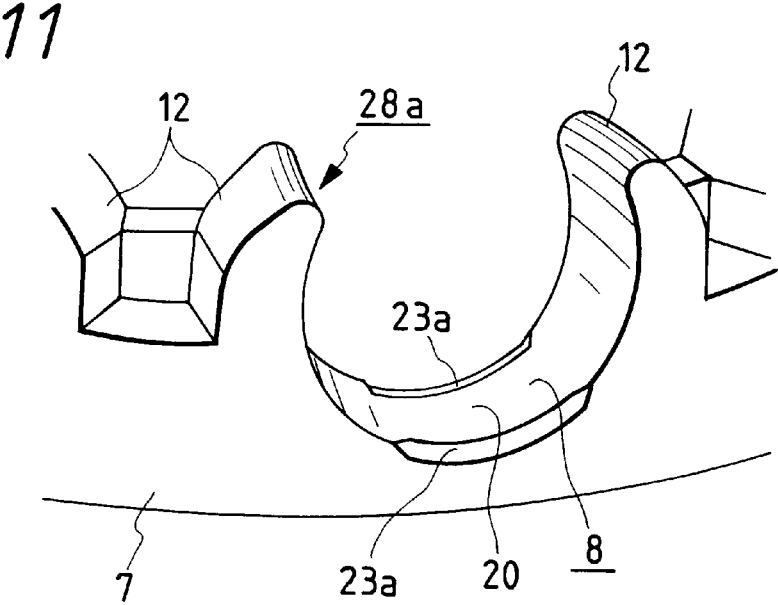
FIG. 11 is a partial enlarged perspective view of a cage which is an eighth embodiment of the invention.

FIG. 11 shows an eighth embodiment of the invention. In the eighth embodiment, in order to form pockets 8 in a cage 28a, a pair of elastic pieces 12 is disposed on a main portion 7 with being separated from each other, and chamfers 23a are formed on the side portions of the recessed face 20 (the bottom of each pocket 8) between the pair of elastic pieces. Also in the eighth embodiment, a lubricant can efficiently enter the clearance between the rolling surface of the ball and a holding recess 11 via the chamfers 23a, with the result that the possibility of inducing vibrations and noises called a cage sound is lowered.

Figure 12:
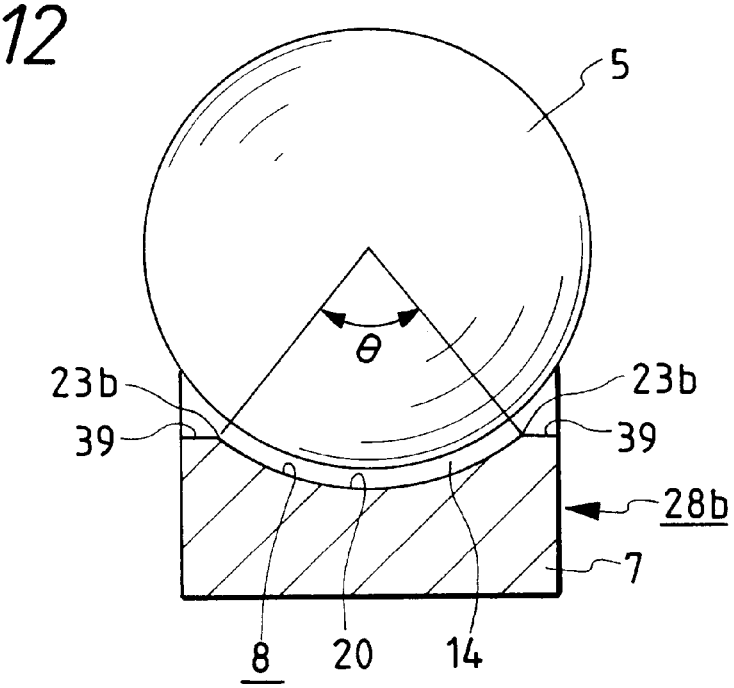
FIG. 12 is an enlarged section view of a cage which is a ninth embodiment of the invention.

FIG. 12 shows a ninth embodiment of the invention. In the ninth embodiment, cylindrical portions 39 are formed in the end opening portions of each pocket 8, respectively. The inner end edges of the cylindrical portions 39 are continuous via chamfers 23b to the end edges of a spherical recessed face 20 formed in the center portion of the pocket 8, respectively. The cage 28b having the pockets 8 in which the chamfers 23b are disposed is formed by injection molding of a synthetic resin. The chamfers 23b are formed in the injection molding. In some cases, the chamfers 23b may be formed by barreling work conducted after injection molding. Alternatively, the chamfers 23b formed by injection molding may be subjected to barreling work, so as to perform the finishing process of their shape.

In any case, the chamfers 23b are curved faces having an arcuate section shape. The radius of curvature of the section shape of the chamfers is set to be 1% to 20% of the outer diameter of the ball 5 held by the pocket 8. More preferably, the radius of curvature of the section shape of the chamfers 23b is set to be 2% to 16% of the outer diameter of the ball, and, further preferably, the radius of curvature of the section shape of the chamfers 23b is set to be 5% to 15% of the outer diameter of the ball. Also in the ninth embodiment thus configured, a lubricant can efficiently enter the clearance between the rolling surface of the ball 5 and the recessed face 20 of the pocket 8. Therefore, a possibility of inducing vibrations and noises called a cage sound is lowered.

Figure 13:
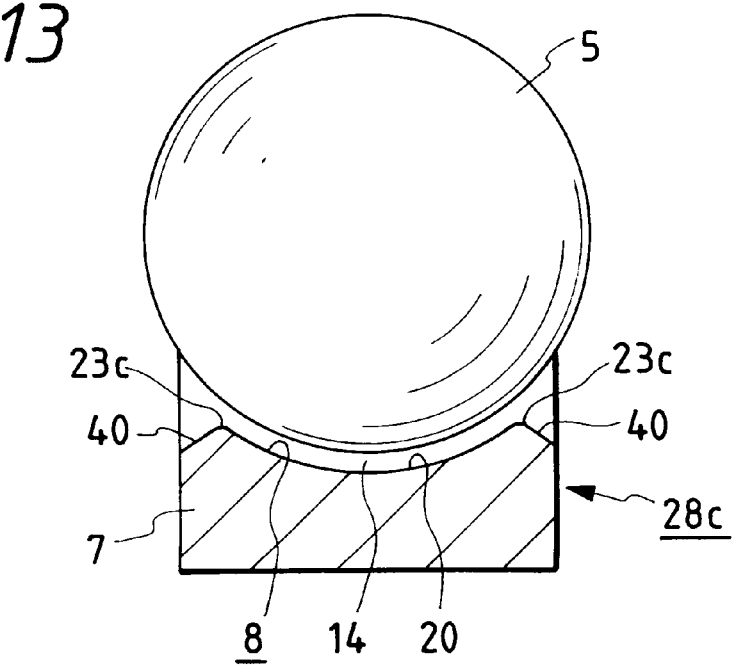
FIG. 13 is an enlarged section view of a cage which is a tenth embodiment of the invention.

FIG. 13 shows a tenth embodiment of the invention. In the tenth embodiment, bowl-shaped inclined faces 40 are formed in the end opening portions of each pocket 8, respectively. The inner diameter of each inclined face 40 is increased as moving toward the opening peripheral portion of the pocket 8. The inner end edges of the inclined faces 40 are continuous via chamfers 23c to the end edges of a spherical recessed face 20 formed in the center portion of the pocket 8, respectively. The cage 28c having the pockets 8 in which the chamfers 23c are disposed is formed by injection molding of a synthetic resin in the same manner as the ninth embodiment. The chamfers 23c are is formed in the injection molding. In some cases, the chamfers 23c may be formed by barreling work conducted after injection molding. Alternatively, the chamfers 23c formed by injection molding may be subjected to barreling work, so as to perform the finishing process of their shape.

In any case, the chamfers 23c are curved faces having an arcuate section shape. The radius of curvature of the section shape of the chamfers is set to be 1% to 20% of the outer diameter of the ball 5 held by the pocket 8. More preferably, the radius of curvature of the section shape of the chamfers 23c is set to be 2% to 16% of the outer diameter of the ball 5, and, further preferably, the radius of curvature of the section shape of the chamfers 23c is set to be 5% to 15% of the outer diameter of the ball 5. Also in the tenth embodiment thus configured, a lubricant can efficiently enter the clearance between the rolling surface of the ball 5 and the spherical recessed face 20 of the pocket 8, via the chamfers 23c. Therefore, the possibility of inducing vibrations and noises called a cage sound is lowered.

EXAMPLES

Next, first and second experiments which were conducted by the inventors in order to ascertain the effects of the invention will be described. Prior to the first experiment, seven kinds of samples of the crown-type cage 6a such as shown in FIG. 12 were prepared as follows: one kind (comparative example) which was obtained by infection molding of polyamide 66 and not subjected to further treatment, so that the comparative example had edges in the opening peripheral portion of the pocket 8; five kinds (Examples 1 to 5) in which the chamfers 23 such as shown in FIG. 10 were formed by barreling work; and one kind (Example 6) in which the chamfers 23a such as shown in FIG. 11 were formed by cutting work. In each kind of sample, ten or twenty cages of the same structure were prepared. Each sample was mounted in a ball bearing. Then, the ball bearing was operated, and it was observed whether a cage sound was generated or not. When the chamfers 23a such as those of Example 6 are to be industrially formed, the chamfers are not formed by cutting but formed during an injection molding process.

The conditions of the barrel work for Examples 1 to 5, and the operation conditions for all the samples were as follows:

(1) Conditions of the barrel work

Common conditions

Triangular alumina particles of 3 mm were used as abrasive grains, and the barrel work was conducted by using a rotary barrel machine or a planetary rotary barrel machine.

Conditions depending on the examples

Example 1: working time=1 hour

Example 2: working time=5 hours

Example 3: working time=12 hours

Example 4: working time=48 hours

Example 5: working time=72 hours (2) Operation conditions of the ball bearings

Condition of lubrication: filled with grease

Rotational speed: 4,000 r.p.m.

Radial load: 100 kgf

Ambient temperature: 0° C.

Under the above-specified conditions, it was observed whether a cage sound was generated or not. For the comparative example, in all the ten samples, it was observed that a cage sound was generated. For Examples 1 to 5, in all the twenty samples of each example, generation of a cage sound was not observed. For Example 6, in all the ten samples, generation of a cage sound was not observed. From these experiments, it was ascertained that the invention is effective in lowering of a cage sound.

Next, the second experiment which was conducted in order to know effects of the radius of curvature of the chamfers on generation of a cage sound will be described.

In the second experiment, the cage 28b of the ninth embodiment shown in FIG. 12 was used, and the ratio of the radius of curvature of the chamfers 23b to the outer diameter (diameter) of the ball 5 was variously changed. The effect of the ratio on a cage sound generated during operation was measured. The test conditions were as follows:

(1) Used bearing: a deep groove ball bearing the designation of which is 6202 (outer diameter: 35 mm; inner diameter: 15 mm; and width: 11 mm)

Used cage: a crown-type cage which has an outer diameter of 25.5 mm, an inner diameter of 21.5 mm, and a width of 5.80 mm and rotates under ball guidance Central angle θ (see FIG. 12) of the recessed face 20: 46 deg.

(2) Operation conditions

Condition of lubrication: ether urea grease having a kinematic viscosity of 100 cst is filled in a space which can be filled with something, at a volume ratio of 40%.

Rotational speed: 4,000 r.p.m.

Radial load: 100 kgf

Thrust load: 50 kgf

Temperature and humidity of ambient: 0° C. and 20%

Figure 14:
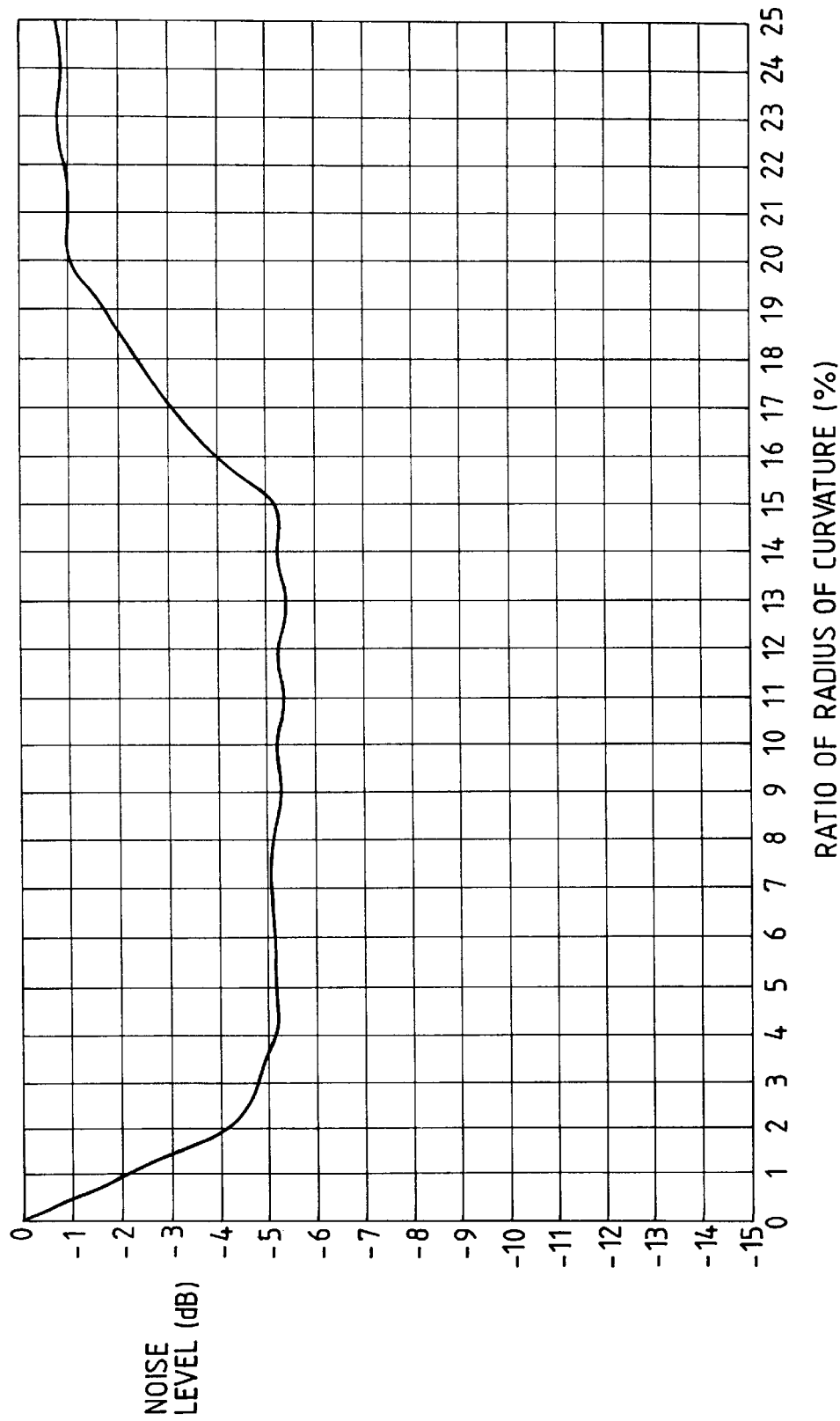
FIG. 14 is a diagram showing relationships between the radius of curvature of chamfers and the level of a cage sound generated during operation.

Under the specified conditions, relationships between the radius of curvature of the chamfers 23b and the level of a cage sound generated during operation were obtained. The results are shown in FIG. 14. In FIG. 14, the abscissa indicates the ratio of the radius of curvature of the section shape of the chamfers 23b to the outer diameter of the ball 5 held by the pocket 8. The ordinate indicates the difference in noise level of ball bearings using cages having various radii of curvatures of the chamfers 23b, with setting the level of noises generated by a ball bearing configured by using the conventional cage 6a shown in FIG. 25, to be 0 dB.

As apparent from FIG. 14, when the radius of curvature of the section shape of the chamfers 23b is set not to be less than 1% of the outer diameter of the ball 5 held by the pocket 8, it is possible to obtain the effect of lowering a cage sound. More preferably, the radius of curvature of the section shape of the chamfers 23b is set to be 2% to 16% of the outer diameter of the ball 5. In this case, the effect of lowering a cage sound is remarkable. Further preferably, the radius of curvature of the section shape of the chamfers 23b is set to be 4% to 15% of the outer diameter of the ball 5. In this case, the effect of lowering a cage sound is more remarkable.

The difference in radius of curvature affects workability in addition to the level of a cage sound the restriction of the upper limit shortens the time period of barreling work, thereby reducing the working cost. The process of working the chamfers 23b so as to have a desired radius of curvature may be conducted by any working method known in the art. In the case of a cage made of a synthetic resin, however, it is preferable to work the cage by using a mold, in the view point of working cost. In the case of a cage made of a metal, it is preferable to work the cage by barreling work, in the view point of working cost. When the radius of curvature of the section shape of the chamfers 23b is larger than 20% of the outer diameter of the ball 5 held by the pocket 8, the force of holding the ball 5 is weakened. This causes defects that the motion amount of the cage is increased and that the ball 5 slips off from the pocket 8. Therefore, a cage in which the radius of curvature is larger than 20% of the outer diameter of the ball 5 is inadequate for ensuring a normal operation of a bearing, and it is difficult to design a rolling bearing into which such a cage is incorporated. As a result, the radius of curvature must be set not to be larger than 20% of the outer diameter of the ball 5.

The cage for a rolling bearing according to the present invention is configured and functions as described above, and hence the lubrication state of the sliding contact portions between the rolling surfaces of the rolling elements and the inner peripheral face of the pockets of the cage is improved. In a rolling bearing configured by using the cage for a rolling bearing of the invention, therefore, generation of a cage sound is suppressed, with the result that a rolling bearing of low-vibration and low-noise is obtained. In the cage for a rolling bearing of the invention, furthermore, since the friction in the sliding contact portions between the rolling surfaces of the rolling elements and the inner peripheral faces of the pockets of the cage is reduced, also the wear resistance of the cage can be improved.

Figure 15:
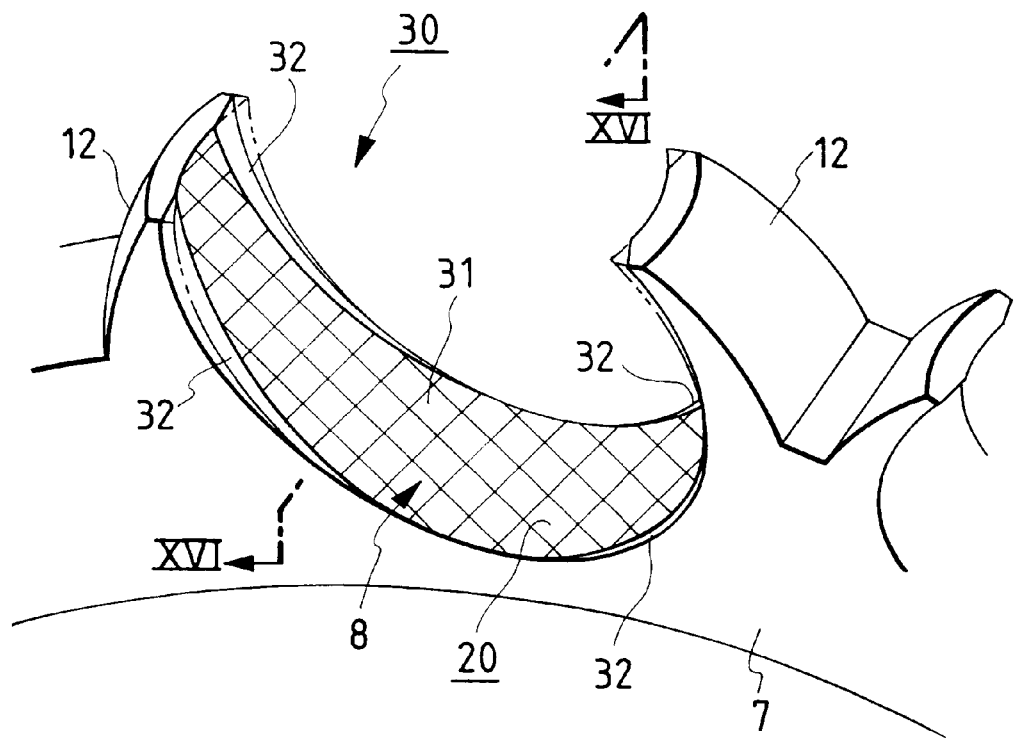
FIG. 15 is a partial enlarged perspective view of a cage which is an eleventh embodiment of the invention.
Figure 16:
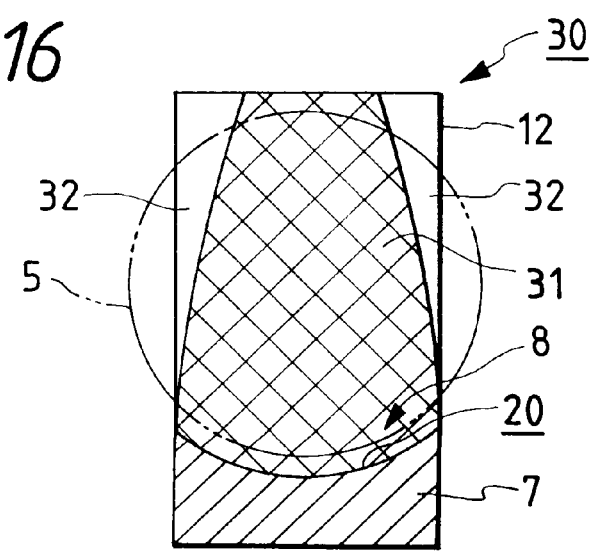
FIG. 16 is a section view taken along the line XVI—XVI of FIG. 15.

Next, FIGS. 15 and 16 show an eleventh embodiment of the invention in which the invention is applied to a crown-type cage such as shown in FIG. 25 made of a synthetic resin. The invention is characterized in that, in order to reduce the frictional area between the inner peripheral face of the pocket 8 and the rolling surface of the ball 5, a holding and guiding face 31 forming the inner peripheral face of the pocket 7 is formed into a unique shape. The configuration and function of the other components are the same as those of the conventional cages. Therefore, illustration and description of equivalent components are omitted or simply performed, and the following description is focused on the characteristic portions of the invention.

In a part of the inner face of the pocket 8, i.e., the portion indicated by crosshatching in FIGS. 15 and 16, the holding and guiding face 31 is formed. The holding and guiding face 31 has a radius of curvature which is slightly larger than that of the rolling surface of the ball 5 functioning as a rolling element and rollingly held in the pocket 8. In the eleventh embodiment, the width (the dimension in the lateral direction in FIG. 16) of the holding and guiding face 31 is made wider in the center portion (the groove bottom portion) of the pocket 8 and, as moving toward the ends (the front ends of the elastic pieces 12), made gradually narrower. The portions of the pocket 8 which are in the vicinity of the side edges and outside the holding and guiding face 31 in the width direction are the non-holding and non-guiding faces 32. The distance between each of the non-holding and non-guiding faces 32 and the rolling surface of the ball 5 is larger than that between the holding and guiding face 31 and the rolling surface. In a state where the cage 30 of the invention is incorporated into a rolling bearing, the rolling surface may rub against the holding and guiding face 31 but does not rub against the non-holding and non-guiding faces 32.

In the thus configured cage for a rolling bearing of the invention, the inner peripheral face of each pocket 8 and the rolling surface of the ball 5 rub against each other only in the holding and guiding face 31, and do not rub against each other in the non-holding and non-guiding faces 32. Therefore, the frictional area between the inner face of the pocket 8 and the rolling surface of the ball 5 is reduced, and frictional vibration occurring in the sliding contact portions between the cage 11a and the balls 5 is reduced, thereby lowering vibrations and noises. In the eleventh embodiment, the width of the holding and guiding face 31 is not simply reduced, and the width of the portion which is widest in the holding and guiding face 31 is sufficiently ensured. Therefore, the radial displacement of the cage 30 with respect to the ball 5 is prevented from being excessively increased. In other words, although the frictional area is reduced, the amount of motion of the cage 30 with respect to the ball 5 can be reduced and generation of a cage sound can be suppressed.

Figure 17:
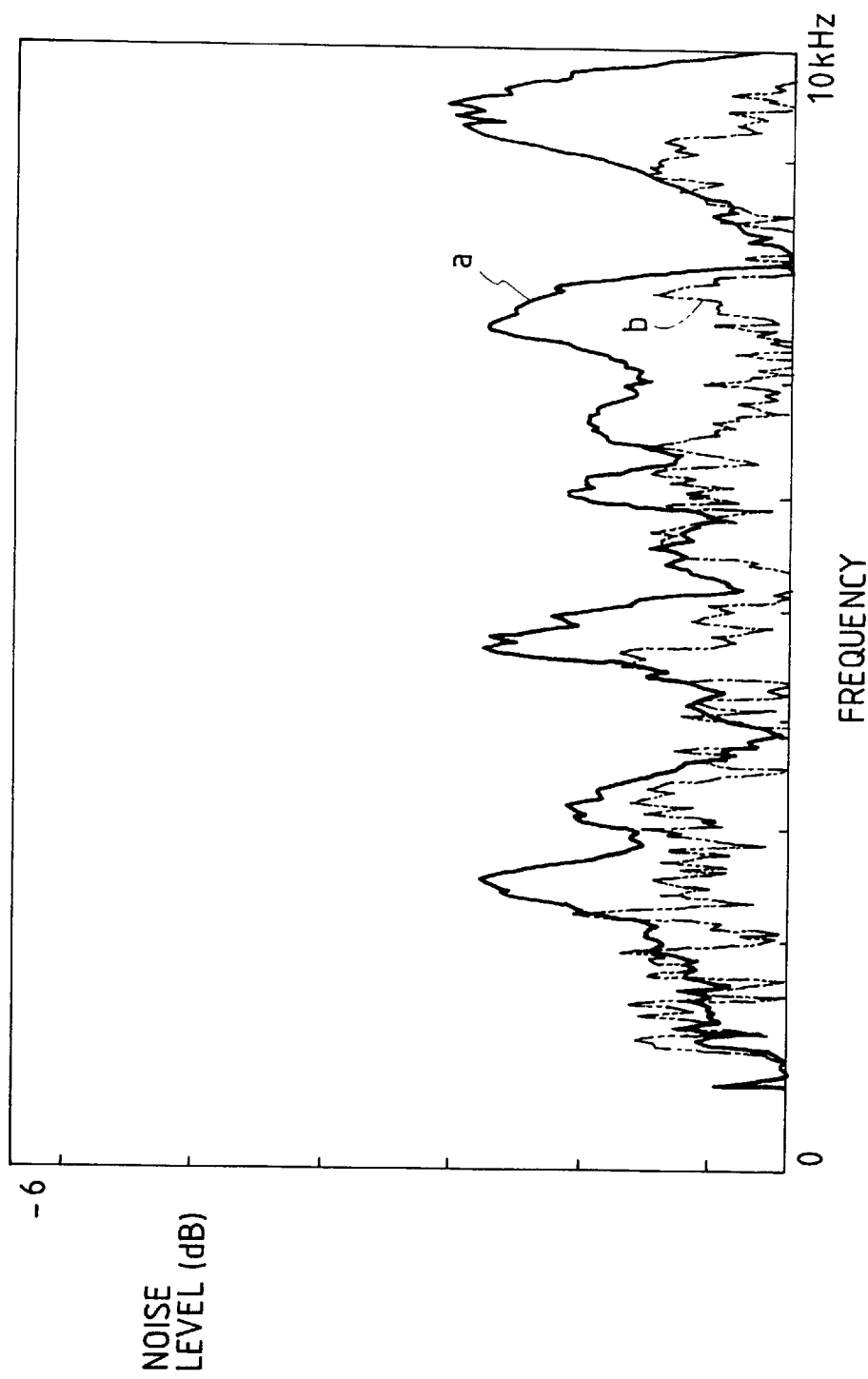
FIG. 17 is a diagram showing the frequency spectrum of noises which are generated from a rolling bearing into which the cage of the eleventh embodiment is incorporated and from that into which a conventional cage is incorporated.
Figure 30:
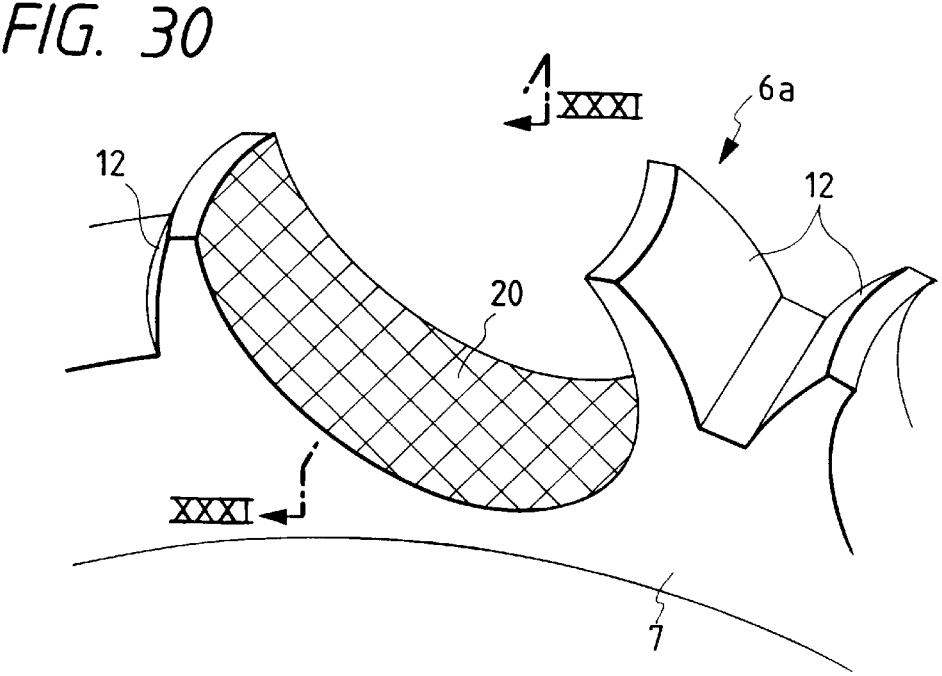
FIG. 30 is a partial enlarged exploded perspective view showing a second example of a conventional cage.
Figure 31:
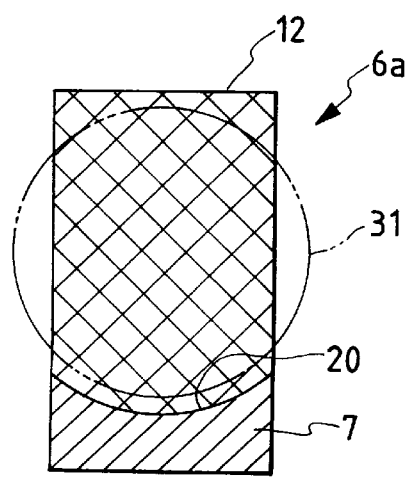
FIG. 31 is a section view taken along the line XXXI—XXXI of FIG. 30.

FIG. 17 shows results of experiments which were conducted by the inventors in order to ascertain the effects of the invention. FIG. 17 is a frequency spectrum diagram of a sound which is generated from a rolling bearing into which a cage is incorporated. In the diagram, the abscissa indicates the frequency and the ordinate the noise level. The two curves a and b indicate measurement results. The curve a drawn by solid lines shows the frequency spectrum of noises generated by a ball bearing configured by using a cage in which, in the same manner as the second example of the conventional structure shown in FIGS. 30 and 31, the inner peripheral face of the pocket 8 functions over the entire width as the holding and guiding face 31. The curve b drawn by broken lines shows the frequency spectrum of noises generated by a ball bearing configured by using a cage in which, in the same manner as the eleventh embodiment shown in FIGS. 15 and 16, the width of the holding and guiding face 31 is made larger in the center portion and smaller in the end portions. In the ball bearings, parts which are identical (or equivalent) to each other were used as components of the ball bearings other than the cages. As is apparent from FIG. 17, in the ball bearing using the cage constructing a rolling bearing of the invention, the high-frequency components which are inconsonant to the ear are remarkably reduced, or the sound characteristics are improved.

Figure 18:
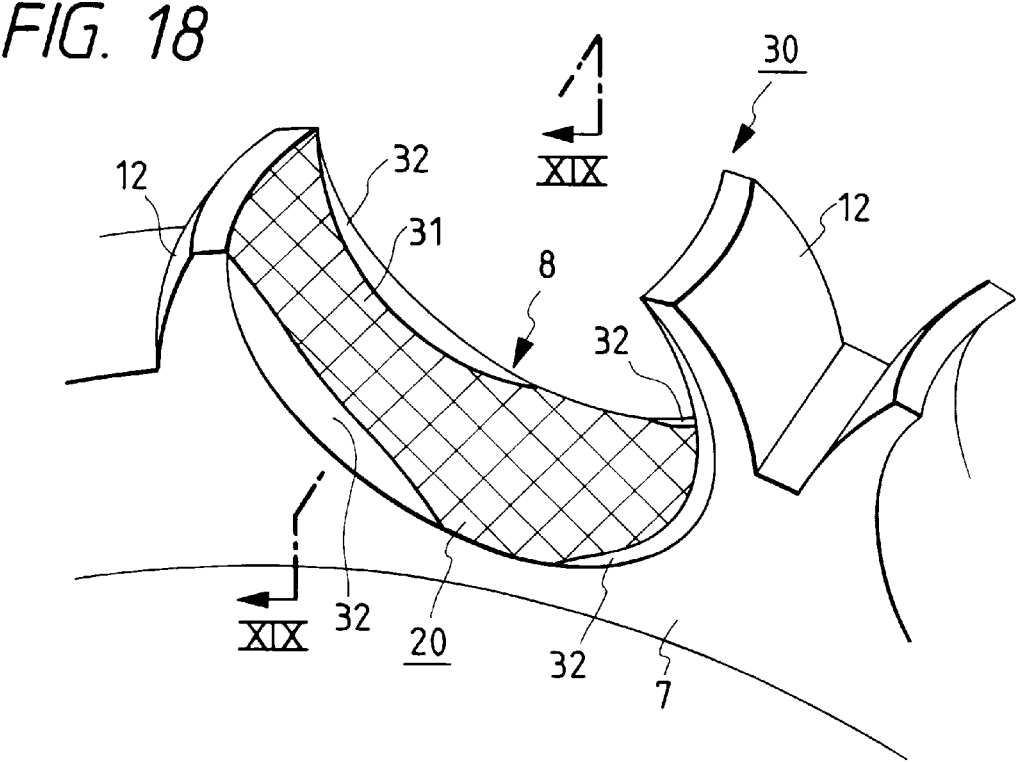
FIG. 18 is a partial enlarged perspective view of a cage which is a twelfth embodiment of the invention.
Figure 19:
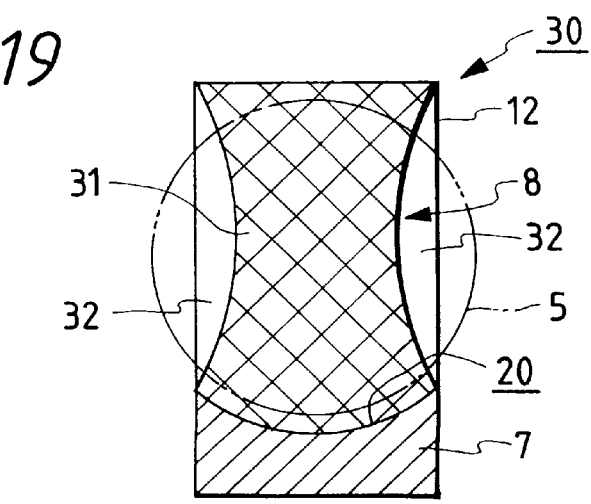
FIG. 19 is a section view taken along the line XIX—XIX of FIG. 18.

FIGS. 18 and 19 show a twelfth embodiment of the invention. In the twelfth embodiment, the width (the dimension in the lateral direction in FIG. 19) of the holding and guiding face 31 formed in the inner peripheral face of the pocket 8 is made wider in the center and end portions, and narrower in the middle portion. According to the twelfth embodiment, the configuration in which the width of the holding and guiding face 31 is made wider in the end portions of the pocket 8 enables the motion of the cage 30 with respect to the ball 5 to be smaller than that attained in the eleventh embodiment. This contributes further reduction of a cage sound. The other configuration and function of the embodiment are the same as those of the eleventh embodiment.

Figure 20:
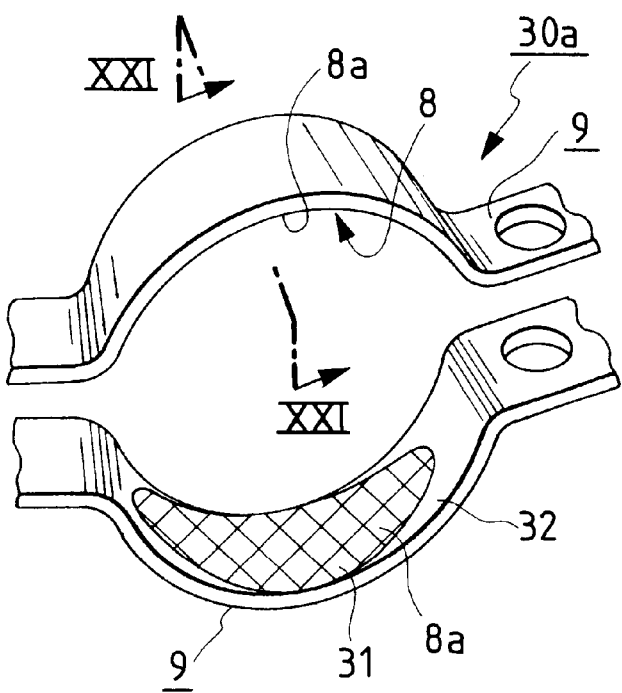
FIG. 20 is a partial enlarged exploded perspective view of a cage which is a thirteenth embodiment of the invention.
Figure 21:
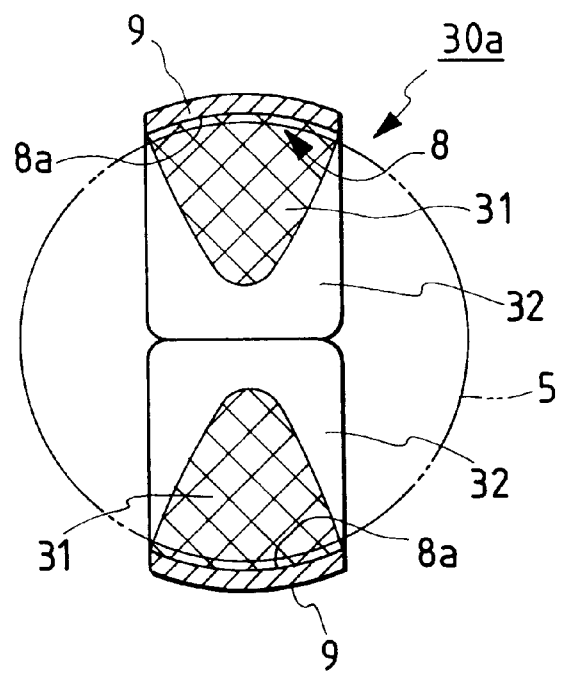
FIG. 21 is a section view taken along the line XXI—XXI of FIG. 20 and showing an assembled state.
Figure 24:
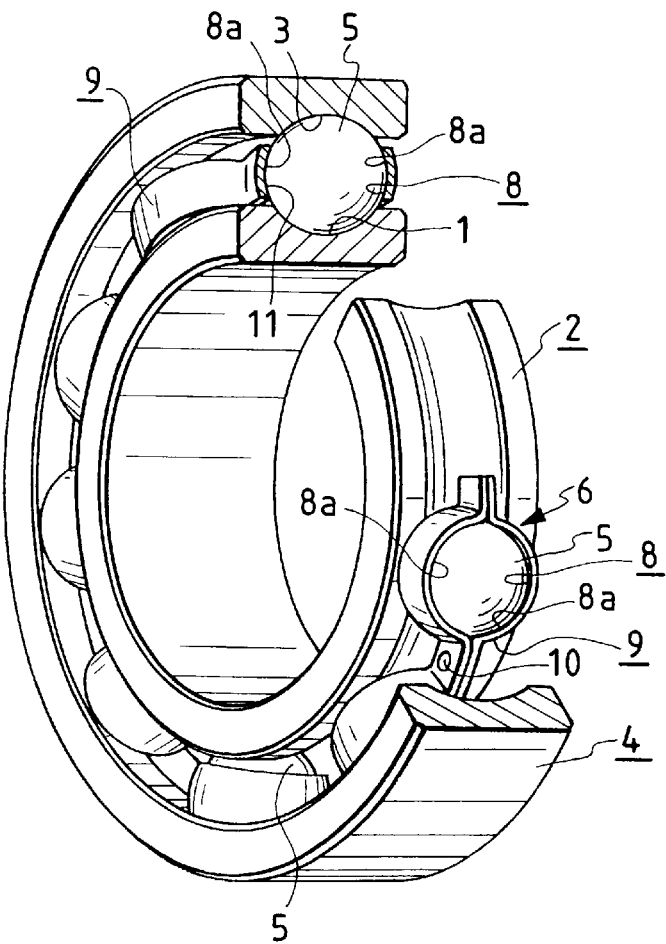
FIG. 24 is a partial cutaway perspective view showing an example of a conventional ball bearing.

FIGS. 20 and 21 show a thirteenth embodiment of the invention in which the invention is applied to a corrugated press cage such as shown in FIG. 24. The pocket 8 is configured in the following manner. In the inner peripheral faces of recesses 8a formed in a pair of elements 9, as indicated by crosshatching in FIGS. 20 and 21, the holding and guiding faces 31 in which the width (the dimension in the lateral direction in FIG. 21) is widest in the center portion and, as moving toward the ends, become gradually narrower are formed. The portions which are in the inner peripheral faces of the recesses 8a and outside the holding and guiding faces 31 are the non-holding and non-guiding faces 32. Also in the thirteenth embodiment, in the same manner as the eleventh embodiment, the frictional area is reduced while suppressing the amount of motion of the cage 30a with respect to the ball 5, 80 that a cage sound can be lowered.

Figure 22:
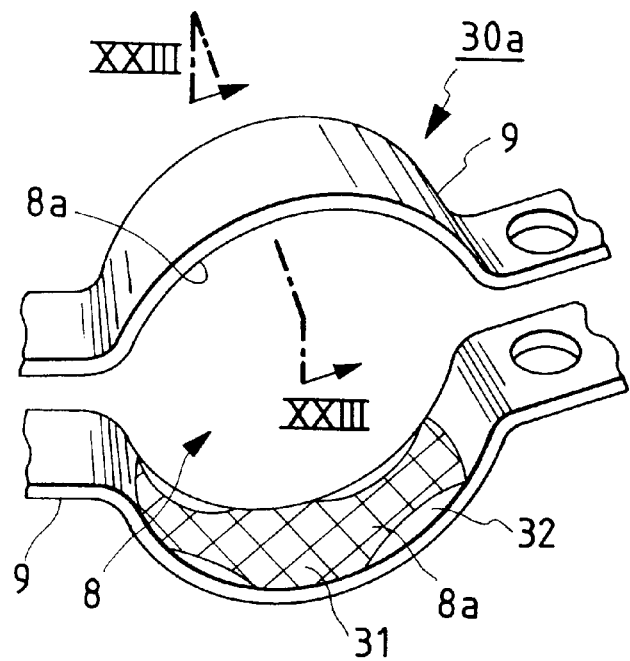
FIG. 22 is a partial enlarged exploded perspective view of a cage which is a fourteenth embodiment of the invention.
Figure 23:
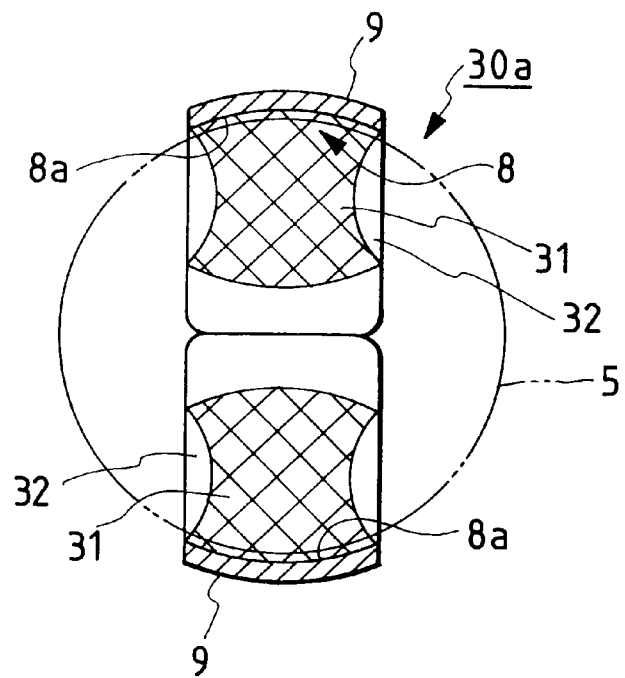
FIG. 23 is a section view taken along the line XXIII—XXIII of FIG. 22 and showing an assembled state.

FIGS. 22 and 23 show a fourteenth embodiment of the invention. In the embodiment, in the same manner as the twelfth embodiment, the width (the dimension in the lateral direction in FIG. 23) of the holding and guiding face 31 formed in the inner peripheral face of the pocket 8 is made wider in the center and end portions, and narrower in the middle portion. The configuration and function of the fourteenth embodiment are the same as those of the twelfth embodiment except that the cage 30a is basically configured as a corrugated press cage.

Also for the twelfth to fourteenth embodiments, in order to ascertain the effects of the invention, experiments were conducted in the same manner as the experiment for the eleventh embodiment, and it was ascertained that a cage sound can be lowered also in the cages for a rolling bearing of the twelfth to fourteenth embodiments. The embodiments have described the rolling bearing which is a ball bearing. The invention may be applied also to a cage which is to be incorporated into a roller bearing or a tapered roller bearing in which rollers or tapered rollers are used as rolling elements.

The cage for a rolling bearing of the invention is configured and functions as described above, and hence sliding friction between the inner face of a pocket and the rolling surface of a rolling element can be reduced, so that a cage sound is lowered. As a result, a rolling bearing of low-noise and low-vibration can be obtained and the performance of a rotating machine into which the rolling bearing is incorporated can be improved. Furthermore, the wear resistance property of the cage can be improved, 80 that the invention can contribute to improvement of the durability of the cage and the rolling bearing.

What is claimed is:

1. A rolling bearing comprising:

an inner race;

an outer race;

a plurality of rolling elements rollingly arranged between the inner race and the outer race; and a cage holding the rolling elements and having an annular shape and a plurality of pockets which are formed at plural positions in a circumferential direction of the cage, wherein each of the pockets has a holding face for holding said rolling element therein, an inner opening peripheral portion which is curved in a direction away from a center of the rolling elements and is confronted with said inner race, and an outer opening peripheral portion which is curved in a direction away from said center of the rolling element and is confronted with said outer race, and said holding face is directly connected with both of said inner and outer opening peripheral portions, to thereby introduce a lubricant oil to said holding face.

2. The rolling bearing of claim 1, wherein at least one of said inner and outer opening peripheral portions comprises a chamfered face.

3. The rolling bearing of claim 2, wherein the chamfered face has a section shape having a radius of curvature which is 1% to 20% of an outer diameter of the rolling elements.

4. The rolling bearing of claim 1, wherein at least one of said inner and outer opening peripheral portions comprises a convex face having an arcuate section shape.

5. The rolling bearing of claim 4, wherein the arcuate section shape has a radius of curvature which is 1% to 20% of an outer diameter of the rolling elements.

6. The rolling bearing of claim 1, wherein each of the pockets has a non-holding face positioned away from said holding face in a width direction of the cage, and wherein a distance between the non-holding face and the rolling surface is larger than a distance between the holding face and the rolling surface.

7. The rolling bearing of any one of claims 2, 4 and 6, wherein the opening peripheral portion has a radius of curvature which is 2% to 16% of an outer diameter of the rolling elements.

8. The rolling bearing of any one of claims 2, 4 and 6, wherein the opening peripheral portion has a radius of curvature which is 4% to 15% of an outer diameter of the rolling elements.

9. The rolling bearing of claim 6, wherein the opening peripheral portion has a radius of curvature which is 1% to 20% of an outer diameter of the rolling elements.

10. The rolling bearing of claim 1, wherein each of said inner and outer opening peripheral portions comprises a chamfered face.

11. The rolling bearing of claim 1, wherein each of said inner and outer opening peripheral portions comprises a convex face having an arcuate section shape.

12. A rolling bearing comprising:

an inner race;

an outer race;

a plurality of rolling elements rollingly arranged between the inner race and the outer race; and a cage holding the rolling elements and having an annular shape and a plurality of pockets which are formed at plural positions in a circumferential direction of the cage, wherein each of the pockets has a holding face for holding a respective one of said rolling elements therein and an opening peripheral portion which is curved in a direction away from a center of the rolling elements, and the opening peripheral portion has a radius of curvature in a cross section which is 4% to 15% of an outer diameter of the rolling elements, to thereby introduce a lubricant oil to said holding face.

13. A rolling bearing comprising:

an inner race;

an outer race;

a plurality of rolling elements rollingly arranged between the inner race and the outer race; and a cage holding the rolling elements and having an annular shape and a plurality of pockets which are formed at plural positions in a circumferential direction of the cage, wherein each of the pockets has a cross section consisting of, a holding portion for holding a respective one of said rolling elements therein and having a first radius of curvature which is slightly larger than an outer diameter of said rolling elements, and an opening peripheral portion curved in a direction away from a center of the rolling elements and directly connected with said holding portion, said opening peripheral portion having a second radius of curvature different from said first radius of curvature, wherein the opening peripheral portion has a radius of curvature which is 4% to 15% of an outer diameter of the rolling elements.

* * * * *